(12) United States Patent
Kageyama et al.

(10) Patent No.: US 8,212,927 B2
(45) Date of Patent: Jul. 3, 2012

(54) IMAGE SIGNAL PROCESSING APPARATUS, IMAGE SIGNAL PROCESSING METHOD AND VIDEO DISPLAY APPARATUS

(75) Inventors: Masahiro Kageyama, Hino (JP); Koichi Hamada, Yokohama (JP); Kenichi Yoneji, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 606 days.

(21) Appl. No.: 12/488,197

(22) Filed: Jun. 19, 2009

(65) Prior Publication Data
US 2010/0020240 A1    Jan. 28, 2010

(30) Foreign Application Priority Data

Jul. 28, 2008  (JP) ................. 2008-193008
Sep. 4, 2008   (JP) ................. 2008-226574

(51) Int. Cl.
*H04N 9/74* (2006.01)
(52) U.S. Cl. ........ 348/581; 348/458; 348/536; 348/580; 348/582; 348/607; 345/611
(58) Field of Classification Search .............. 348/561, 348/562, 582, 536, 537, 441, 445, 458, 607, 348/580, 581; 345/611, 698; 382/298–299, 382/264, 275, 278
See application file for complete search history.

(56) References Cited

U.S. PATENT DOCUMENTS 6,023,535 A * 2/2000 Aoki ..................... 382/299
2008/0018786 A1  1/2008 Kageyama et al.

FOREIGN PATENT DOCUMENTS

| JP | 08-336046 | 12/1996 |
| JP | 9-069755 | 3/1997 |
| JP | 2007-324789 | 12/2007 |

* cited by examiner

*Primary Examiner* — Kristine Kincaid
*Assistant Examiner* — Sumaiya A Chowdhury
(74) *Attorney, Agent, or Firm* — McDermott Will & Emery LLP

(57) ABSTRACT

The present invention relates to a technology of appropriately improving image resolution. According to an image signal processing method of the present invention, an input video signal contains an image signal whose pixel size is converted at a specified magnification scale. The input image signal is used to calculate sampling frequencies for image signals before and after the pixel size conversion. A ratio of sampling frequencies before and after the pixel size conversion is used to determine the specified magnification scale. A sampling phase for the image signal before the pixel size conversion is calculated from the input image signal after the pixel size conversion. A sampling carrier for the image signal before the pixel size conversion is generated from the sampling frequency and the sampling phase both before the pixel size conversion.

7 Claims, 24 Drawing Sheets

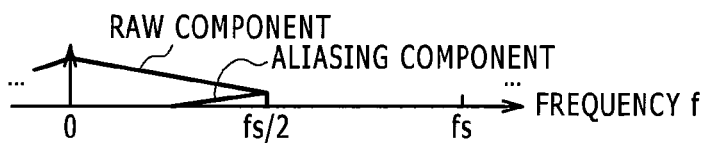
FIG.7A
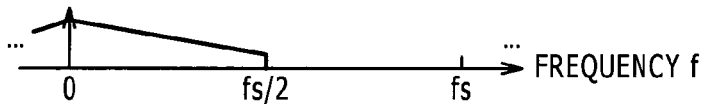
FIG.7B
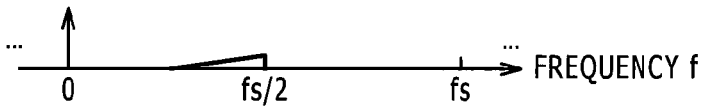
FIG.7C
FIG.7D
FIG.7E
FIG.8
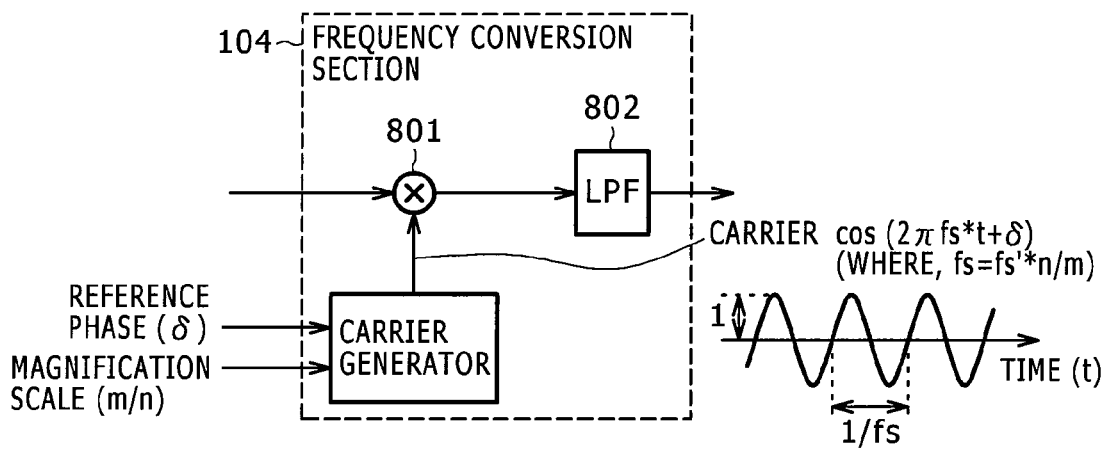

FREQUENCY f

FREQUENCY f

FREQUENCY f

FREQUENCY f

FREQUENCY f

FIG. 13D

| θ | C00 | C10 | C20 | C30 |
|---|---|---|---|---|
| 0 | 0.5 | — | — | — |
| π/8 | 0.5 | -2.51 | 0.5 | 2.51 |
| 2π/8 | 0.5 | -1.21 | 0.5 | 1.21 |
| 3π/8 | 0.5 | -0.75 | 0.5 | 0.75 |
| 4π/8 | 0.5 | -0.5 | 0.5 | 0.5 |
| 5π/8 | 0.5 | -0.33 | 0.5 | 0.33 |
| 6π/8 | 0.5 | -0.21 | 0.5 | 0.21 |
| 7π/8 | 0.5 | -0.1 | 0.5 | 0.1 |
| 8π/8 | 0.5 | 0 | 0.5 | 0 |
| 9π/8 | 0.5 | 0.1 | 0.5 | -0.1 |
| 10π/8 | 0.5 | 0.21 | 0.5 | -0.21 |
| 11π/8 | 0.5 | 0.33 | 0.5 | -0.33 |
| 12π/8 | 0.5 | 0.5 | 0.5 | -0.5 |
| 13π/8 | 0.5 | 0.75 | 0.5 | -0.75 |
| 14π/8 | 0.5 | 1.21 | 0.5 | -1.21 |
| 15π/8 | 0.5 | 2.51 | 0.5 | -2.51 |

FIG. 13A (1) SUM OF RAW COMPONENTS ALONG Re AXIS =1
(2) SUM OF RAW COMPONENTS ALONG Im AXIS =0
(3) SUM OF ALIASING COMPONENTS ALONG Re AXIS =0
(4) SUM OF ALIASING COMPONENTS ALONG Im AXIS =0

⇩

FIG. 13B (1) C00+C20=1
(2) C10+C30=0
(3) C00+C20·cosθ−C30·sinθ=0
(4) C10+C20·sinθ+C30·cosθ=0

C00=1/2
C10=−(1+cosθ)/(2sinθ)
C20=1/2
C30=(1+cosθ)/(2sinθ)

⇧

FIG.14A (1) SUM OF RAW COMPONENTS ALONG Re AXIS =0
(2) SUM OF RAW COMPONENTS ALONG Im AXIS =0
(3) SUM OF ALIASING COMPONENTS ALONG Re AXIS =1
(4) SUM OF ALIASING COMPONENTS ALONG Im AXIS =0

FIG.14B (1) $C_{02} + C_{22} = 0$
(2) $C_{12} + C_{32} = 0$
(3) $C_{02} + C_{22} \cdot \cos\theta - C_{32} \cdot \sin\theta = 1$
(4) $C_{12} + C_{22} \cdot \sin\theta + C_{32} \cdot \cos\theta = 0$

FIG.14C $C_{02} = 1/2$
$C_{12} = (1 + \cos\theta)/(2\sin\theta)$
$C_{22} = -1/2$
$C_{32} = -(1 + \cos\theta)/(2\sin\theta)$

FIG.14D

| θ | C02 | C12 | C22 | C32 |
|---|---|---|---|---|
| 0 | 0.5 | — | 0.5 | — |
| π/8 | 0.5 | 2.51 | 0.5 | -2.51 |
| 2π/8 | 0.5 | 1.21 | 0.5 | -1.21 |
| 3π/8 | 0.5 | 0.75 | 0.5 | -0.75 |
| 4π/8 | 0.5 | 0.5 | 0.5 | -0.5 |
| 5π/8 | 0.5 | 0.33 | 0.5 | -0.33 |
| 6π/8 | 0.5 | 0.21 | 0.5 | -0.21 |
| 7π/8 | 0.5 | 0.1 | 0.5 | -0.1 |
| 8π/8 | 0.5 | 0 | 0.5 | 0 |
| 9π/8 | 0.5 | -0.1 | 0.5 | 0.1 |
| 10π/8 | 0.5 | -0.21 | 0.5 | 0.21 |
| 11π/8 | 0.5 | -0.33 | 0.5 | 0.33 |
| 12π/8 | 0.5 | -0.5 | 0.5 | 0.5 |
| 13π/8 | 0.5 | -0.75 | 0.5 | 0.75 |
| 14π/8 | 0.5 | -1.21 | 0.5 | 1.21 |
| 15π/8 | 0.5 | -2.51 | 0.5 | 2.51 |

FIG. 15A (1) SUM OF RAW COMPONENTS ALONG Re AXIS =0
(2) SUM OF RAW COMPONENTS ALONG Im AXIS =0
(3) SUM OF ALIASING COMPONENTS ALONG Re AXIS =0
(4) SUM OF ALIASING COMPONENTS ALONG Im AXIS =1

FIG. 15B (1) $C03 + C23 = 1$
(2) $C13 + C33 = 0$
(3) $C03 + C23 \cdot \cos\theta - C33 \cdot \sin\theta = 0$
(4) $C13 + C23 \cdot \sin\theta + C33 \cdot \cos\theta = 1$

FIG. 15C $C03 = -(1+\cos\theta)/(2\sin\theta)$
$C13 = 1/2$
$C23 = (1+\cos\theta)/(2\sin\theta)$
$C33 = 1/2$

FIG. 15D

| θ | C03 | C13 | C23 | C33 |
|---|---|---|---|---|
| 0 | — | 0.5 | — | 0.5 |
| π/8 | -2.51 | 0.5 | 2.51 | 0.5 |
| 2π/8 | -1.21 | 0.5 | 1.21 | 0.5 |
| 3π/8 | -0.75 | 0.5 | 0.75 | 0.5 |
| 4π/8 | -0.5 | 0.5 | 0.5 | 0.5 |
| 5π/8 | -0.33 | 0.5 | 0.33 | 0.5 |
| 6π/8 | -0.21 | 0.5 | 0.21 | 0.5 |
| 7π/8 | -0.1 | 0.5 | 0.1 | 0.5 |
| 8π/8 | 0 | 0.5 | 0 | 0.5 |
| 9π/8 | 0.1 | 0.5 | -0.1 | 0.5 |
| 10π/8 | 0.21 | 0.5 | -0.21 | 0.5 |
| 11π/8 | 0.33 | 0.5 | -0.33 | 0.5 |
| 12π/8 | 0.5 | 0.5 | -0.5 | 0.5 |
| 13π/8 | 0.75 | 0.5 | -0.75 | 0.5 |
| 14π/8 | 1.21 | 0.5 | -1.21 | 0.5 |
| 15π/8 | 2.51 | 0.5 | -2.51 | 0.5 |

FIG.16A $$\left(\begin{array}{cc|c|c} 1 & 0 & 0 & 0 \\ 0 & 1 & 0 & 0 \\ 0 & 0 & 1 & 0 \\ 0 & 0 & 0 & 1 \end{array}\right) = \left(\begin{array}{cccc} 1 & 0 & 1 & 0 \\ 0 & 1 & 0 & 1 \\ 1 & 0 & \cos\theta & -\sin\theta \\ 0 & 1 & \sin\theta & \cos\theta \end{array}\right) \left(\begin{array}{cc|c|c} C00 & C01 & C02 & C03 \\ C10 & C11 & C12 & C13 \\ C20 & C21 & C22 & C23 \\ C30 & C31 & C32 & C33 \end{array}\right)$$

1601    1603           1604           1605    1606   1607
     1602

FIG.16B $$\left(\begin{array}{cc|c|c} C00 & C01 & C02 & C03 \\ C10 & C11 & C12 & C13 \\ C20 & C21 & C22 & C23 \\ C30 & C31 & C32 & C33 \end{array}\right) = \left(\begin{array}{cccc} 1 & 0 & 1 & 0 \\ 0 & 1 & 0 & 1 \\ 1 & 0 & \cos\theta & -\sin\theta \\ 0 & 1 & \sin\theta & \cos\theta \end{array}\right)^{-1}$$

1605    1606   1607

$$= \left(\begin{array}{cccc} \dfrac{1}{2} & \dfrac{1+\cos\theta}{2\sin\theta} & \dfrac{1}{2} & \dfrac{-(1+\cos\theta)}{2\sin\theta} \\ \dfrac{-(1+\cos\theta)}{2\sin\theta} & \dfrac{1}{2} & \dfrac{1+\cos\theta}{2\sin\theta} & \dfrac{1}{2} \\ \dfrac{1}{2} & \dfrac{-(1+\cos\theta)}{2\sin\theta} & \dfrac{1}{2} & \dfrac{1+\cos\theta}{2\sin\theta} \\ \dfrac{1+\cos\theta}{2\sin\theta} & \dfrac{1}{2} & \dfrac{-(1+\cos\theta)}{2\sin\theta} & \dfrac{1}{2} \end{array}\right)$$

FIG. 18

$$\begin{pmatrix} 1 \\ 0 \\ 0 \end{pmatrix} = \begin{pmatrix} 1 & 1 & 1 \\ 1 & \cos\alpha & \cos\beta \\ 0 & \sin\alpha & -\sin\beta \end{pmatrix} \begin{pmatrix} C00 \\ C10 \\ C20 \end{pmatrix}$$

$\quad\quad\;\; 1801 \quad\quad\quad\quad 1802 \quad\quad\quad 1803$

FIG. 19A $$\begin{pmatrix} 1 & 0 & 0 \\ 0 & 1 & 0 \\ 0 & 0 & 1 \end{pmatrix} = \begin{pmatrix} 1 & 1 & 1 \\ 1 & \cos\alpha & \cos\beta \\ 0 & \sin\alpha & -\sin\beta \end{pmatrix} \begin{pmatrix} C00 & C01 & C02 \\ C10 & C11 & C12 \\ C20 & C21 & C22 \end{pmatrix}$$

1801  1902             1802                  1803   1904
     1901                                         1903

FIG. 19B $$\begin{pmatrix} C00 & C01 & C02 \\ C10 & C11 & C12 \\ C20 & C21 & C22 \end{pmatrix} = \begin{pmatrix} 1 & 1 & 1 \\ 1 & \cos\alpha & \cos\beta \\ 0 & \sin\alpha & -\sin\beta \end{pmatrix}^{-1}$$

1803   1904
    1903

$$= \frac{1}{-\cos\alpha\sin\beta - \cos\beta\sin\alpha + \sin\alpha + \sin\beta} \begin{pmatrix} -\cos\alpha\sin\beta - \cos\beta\sin\alpha & \sin\alpha + \sin\beta & -\cos\alpha + \cos\beta \\ -\sin\beta & -\sin\beta & -\cos\beta + 1 \\ \sin\alpha & -\sin\alpha & \cos\alpha - 1 \end{pmatrix}$$

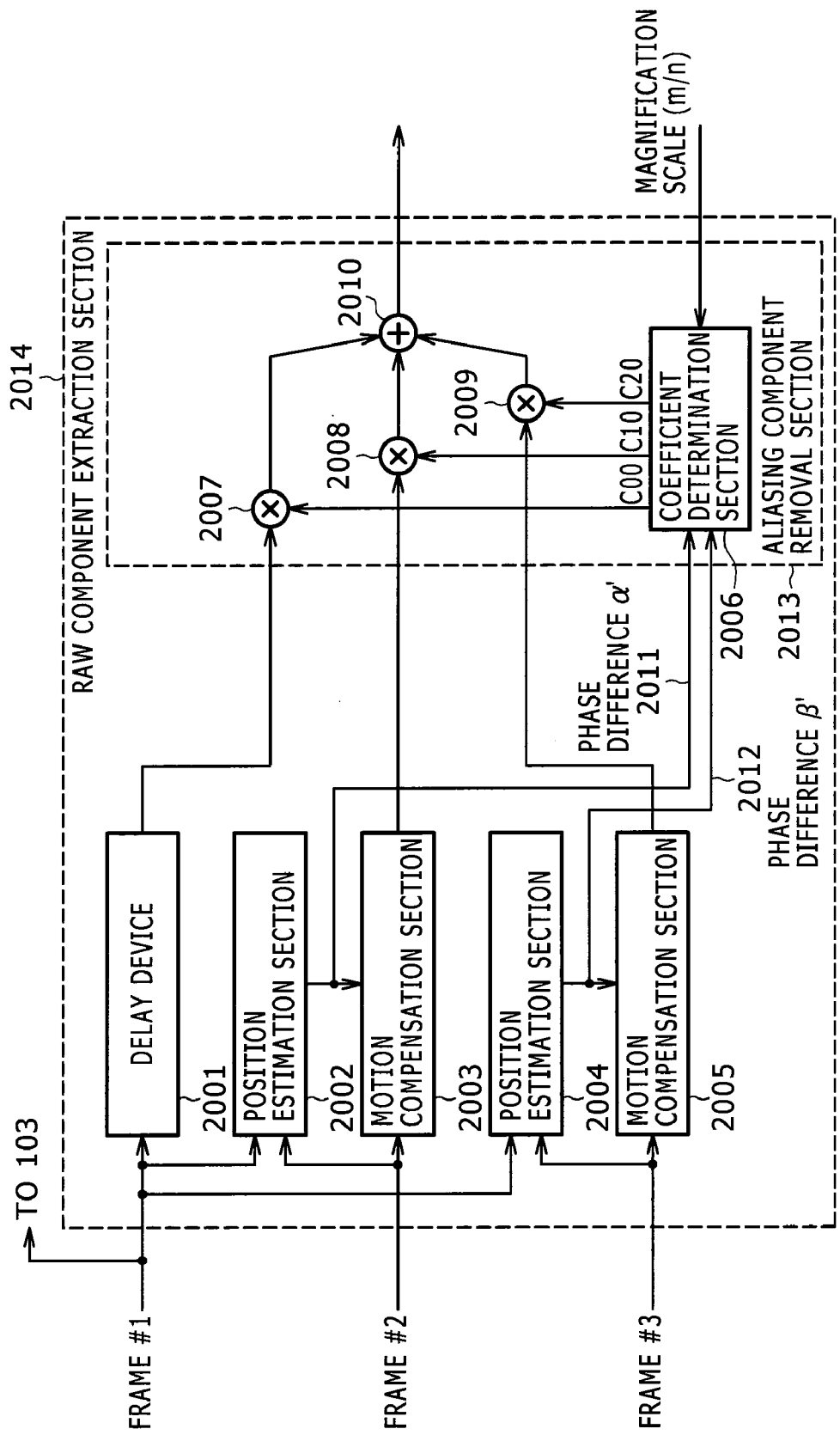

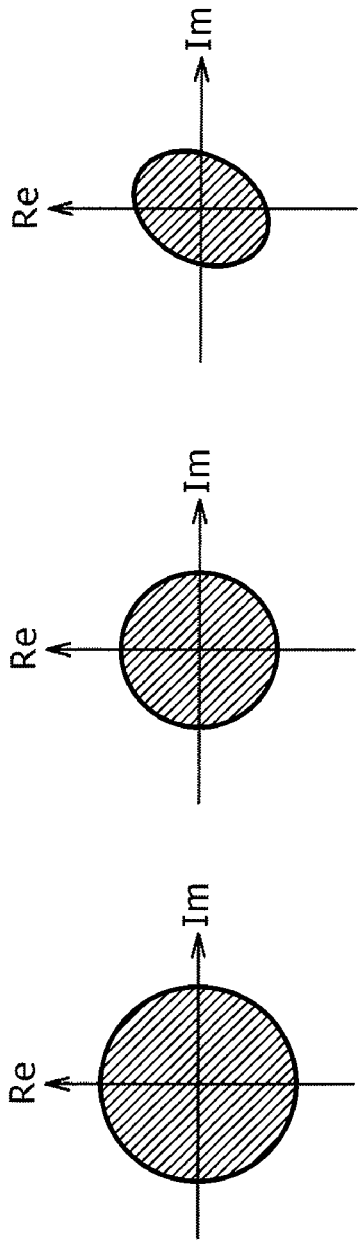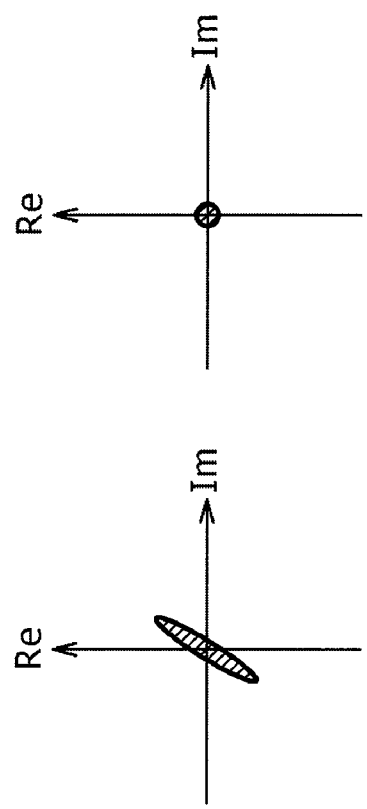

(n-1)TH FRAME nTH FRAME (n-1)TH FRAME nTH FRAME

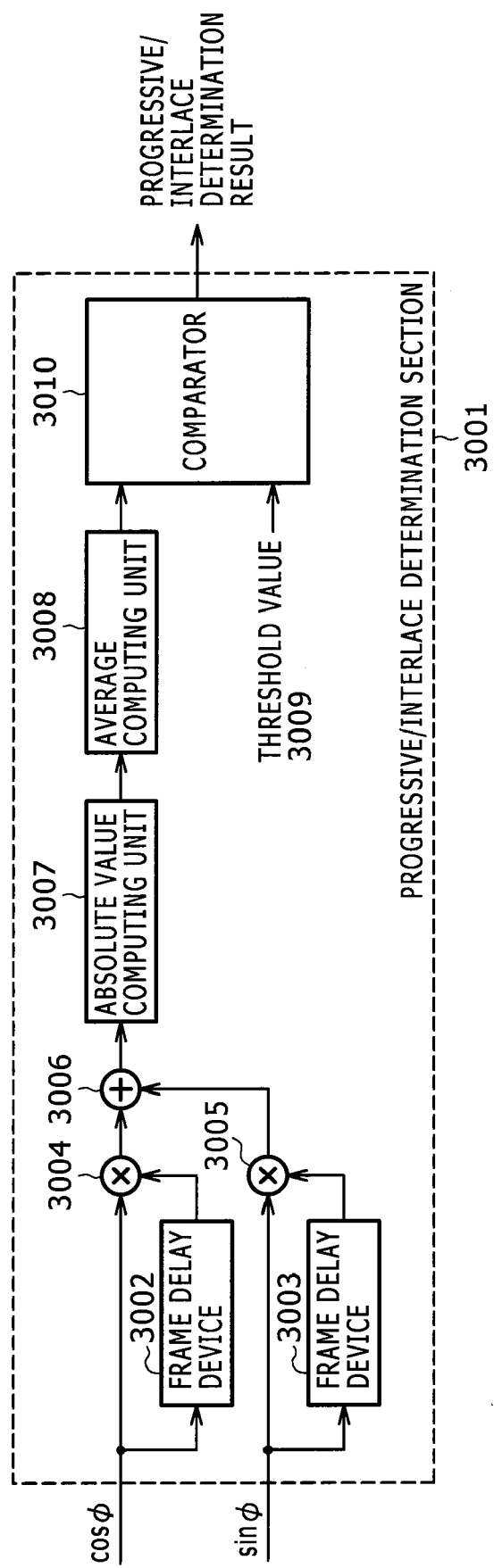

FIG.31

$Sxx = \Sigma xj^2 \cdots (1)$
$Syy = \Sigma yj^2 \cdots (2)$
$Sxy = \Sigma (xjyj) \cdots (3)$ $f(a) = \Sigma(yi-axj)^2/(a^2+1) = \Sigma(yi^2 - 2axjyj + a^2xj^2)/(a^2+1) = (Syy - 2aSxy + a^2Sxx)/(a^2+1) \cdots (4)$
$df(a)/da = 2(a^2 Sxy + a(Sxx-Syy) - Sxy)/(a^2+1)^2 = 0 \cdots (5)$ $a = (Syy - Sxx + sqrt((Sxx-Syy)^2 + 4Sxy^2))/(2Sxy) \cdots (6)$ $fmin = f(a) = f(Syy - Sxx + sqrt((Sxx-Syy)^2 + 4Sxy^2))/(2Sxy)) = (Sxx+Syy)(1-r)/2 \cdots (7)$
$r = sqrt(1 - 4(SxxSyy - Sxy^2)/(Sxx+Syy)^2)$ (WHERE, $0 \leq r \leq 1$) $\cdots (8)$
$R = (1-r^2)/4 = (SxxSyy - Sxy^2)/(Sxx+Syy)^2$ (WHERE, $0 \leq R \leq 0.25$) $\cdots (9)$

FIG.32

$\cos \phi = a/sqrt(a^2+1) \cdots (10)$
$\sin \phi = 1/sqrt(a^2+1) \cdots (11)$ $\cos \delta = \cos 2\phi = \cos^2 \phi - \sin^2 \phi = (a^2-1)/(a^2+1) \cdots (12)$
$\sin \delta = \sin 2\phi = 2\sin\phi \cos\phi = 2a/(a^2+1) \cdots (13)$ $\cos(2\pi fs*t + \delta) = \cos(2\pi fs*t)\cos \delta - \sin(2\pi fs*t)\sin \delta \cdots (14)$
$\sin(2\pi fs*t + \delta) = \sin(2\pi fs*t)\cos \delta + \cos(2\pi fs*t)\sin \delta \cdots (15)$

IMAGE SIGNAL PROCESSING APPARATUS, IMAGE SIGNAL PROCESSING METHOD AND VIDEO DISPLAY APPARATUS

CLAIM OF PRIORITY

The present application claims priority from Japanese patent applications serial No. JP 2008-193008, filed on Jul. 28, 2008 and serial No. JP 2008-226574, filed on Sep. 4, 2008, the contents of which are hereby incorporated by reference into this application.

BACKGROUND OF THE INVENTION (1) Field of the Invention

The present invention relates to a technology of improving image signal resolution.

(2) Description of the Related Art

There is a trend of increasing the screen size of television sets. Generally, digital signal processes are used to increase the number of horizontal and vertical pixels for display instead of displaying original image signals supplied from broadcasting or telecommunication sources or storage media. The resolution cannot be increased simply by increasing the number of pixels based on a low-pass filter or a spline function using the sinc function.

Japanese Published Unexamined Patent Application No. 2007-324789 discloses the technology of merging multiple input image frames (hereafter just referred to as frames) into a single frame so as to increase the number of pixels while ensuring high resolution.

Japanese Published Unexamined Patent Application No. Hei 8-336046 discloses the technology of generating a weighted sum of image signals based on phase differences between three input image frames and removing aliasing components so as to ensure high resolution.

Japanese Published Unexamined Patent Application No. Hei 9-69755 discloses the technology of generating a weighted sum of image signals based on phase differences between nine input image frames and removing aliasing components so as to ensure high resolution in a two-dimensional direction including horizontal and vertical directions.

SUMMARY OF THE INVENTION

The present digital television broadcasting broadcasts programs using a terrestrial station, broadcasting satellite (BS), or communication satellite (CS) based on high definition (HD) image signals in addition to conventional standard definition (SD) image signals. Not all programs use image signals captured by a high definition (HD) camera even though the broadcasting uses an HD image signal or an equivalent signal representing a large number of pixels. For example, it is well known that some of the programs or scenes are broadcast in such a manner as converting (or up-converting) an image signal captured by an SD camera featuring a small number of pixels into an HD image signal or an equivalent signal representing a large number of pixels.

The resolution is less effectively improved despite applying the conventional resolution conversion processes described in the above-mentioned Japanese Published Unexamined Patent Applications to up-converted signals.

The present invention has been made in consideration of the foregoing. It is therefore an object of the present invention to effectively improve the resolution of image signals.

To achieve the above-mentioned object, an embodiment of the invention may be configured in accordance with the appended claims.

The invention can effectively improve the resolution of image signals.

BRIEF DESCRIPTION OF THE DRAWINGS

These and other features, objects and advantages of the present invention will become more apparent from the following description when taken in conjunction with the accompanying drawings wherein:

FIGS. 7A to 7E are explanatory diagrams showing operations according to the first embodiment;

FIG. 8 is an explanatory diagram showing a configuration according to the first embodiment of the invention;

FIGS. 13A to 13D are explanatory diagrams showing an operation according to the first embodiment of the invention;

FIGS. 14A to 14D are explanatory diagrams showing an operation according to the second embodiment of the invention;

FIGS. 15A to 15D are still the other explanatory diagrams showing an operation according to the second embodiment of the invention;

FIGS. 16A and 16B are yet the other explanatory diagrams showing an operation according to the second embodiment of the invention;

FIG. 18 is an explanatory diagram showing an operation according to a third embodiment of the invention;

FIGS. 19A and 19B are explanatory diagrams showing an operation according to a fourth embodiment of the invention;

FIG. 20 is an explanatory diagram showing a configuration according to a third embodiment of the invention;

FIGS. 25A to 25E are the other explanatory diagrams showing operations according to the fifth embodiment of the invention;

FIG. 30 is an explanatory diagram showing a configuration according to the fifth embodiment of the invention;

FIG. 31 is yet still another explanatory diagram showing an operation according to the fifth embodiment of the invention; and FIG. 32 is still yet another explanatory diagram showing an operation according to the fifth embodiment of the invention.

DETAILED DESCRIPTION OF THE EMBODIMENT

Figure 1:
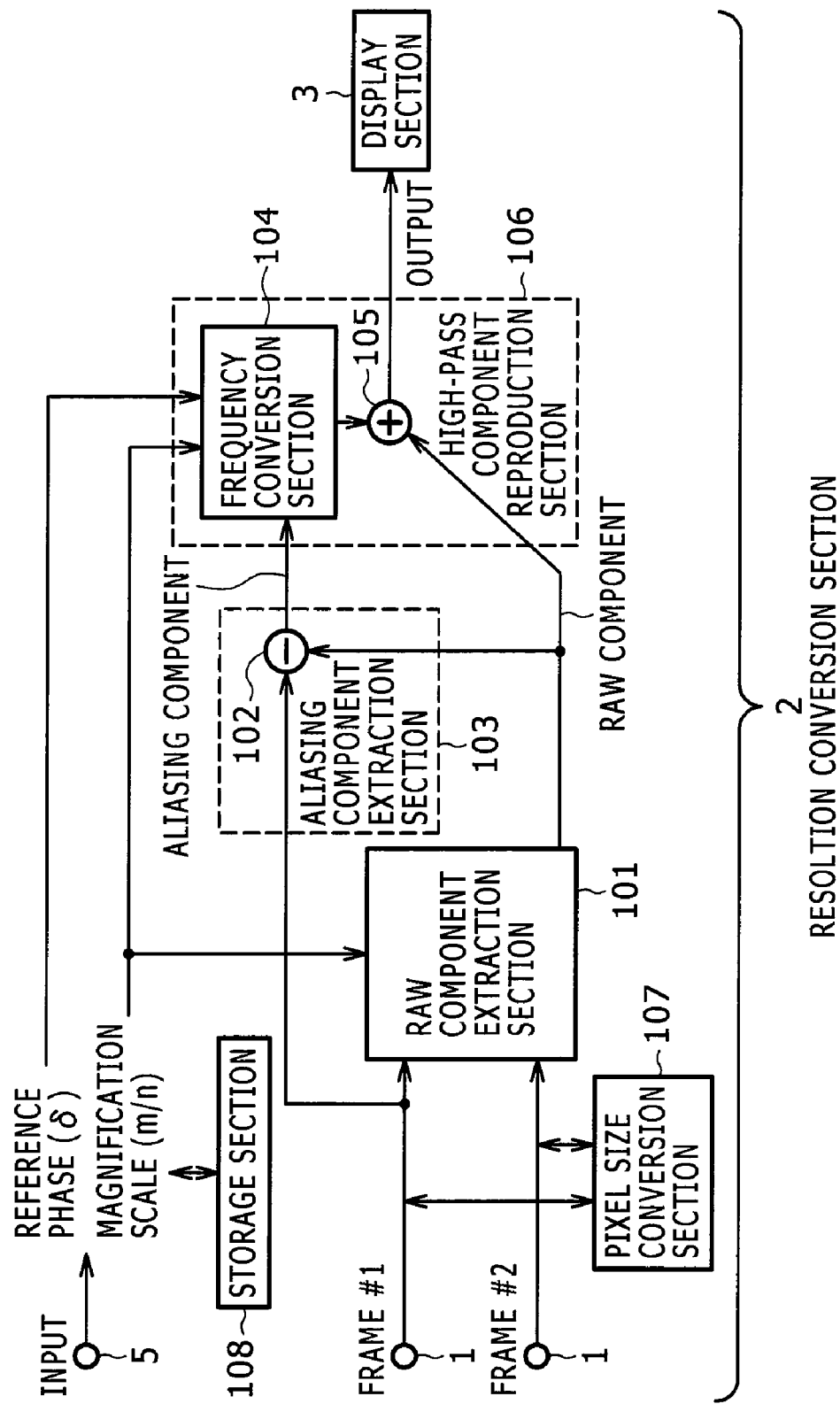
FIG. 1 is an explanatory diagram showing a configuration according to a first embodiment of the invention.

Embodiments of the present invention will be described in further detail with reference to the accompanying drawings.

In the drawings, parts or components depicted by the same reference numerals are assumed to embody the same functions.

The expression "phase" used in the descriptions and drawings of this specification contains the meaning of "position" on a two-dimensional image in the context of the two-dimensional image space. The position is expressed in decimal pixel precision.

The expression "up-convert" used in the descriptions and drawings of this specification signifies a conversion process of increasing the number of pixels in an image or a conversion process of magnifying an image.

The expression "motion compensation" used in the descriptions and drawings of this specification contains the meaning of calculating a phase difference or a sampling phase, i.e., a difference between spatial positions, and aligning positions.

The expression "Re axis" used in the descriptions and drawings of this specification signifies a real number axis.

The expression "Im axis" used in the descriptions and drawings of this specification signifies an imaginary number axis.

The expression "up-rate" used in the descriptions and drawings of this specification contains the meaning of up-sampling.

The expression "down-rate" used in the descriptions and drawings of this specification contains the meaning of down-sampling.

The expression "sampling frequency" used in the descriptions and drawings of this specification signifies the number of pixels per unit length in a frame image. For example, let us consider that the unit length corresponds to a length between left and right ends and a length between top and bottom ends and that a frame image contains 1920 pixels horizontally and 1080 pixels vertically. In this case, the horizontal sampling frequency is 1920 pixels per width (ppw). The vertical sampling frequency is 1080 pixels per height (pph).

The expression "sampling carrier" used in the descriptions and drawings of this specification signifies one or more sine waves when a sampling pulse is considered to be a combination of a sine wave (fundamental wave) having a cycle equivalent to a sampling interval and a sine wave (higher harmonic wave) whose frequency equals the integral multiple of that frequency.

Embodiments of the present invention will be described in further detail with reference to the accompanying drawings.

<First Embodiment>

FIG. 1 shows an image signal processing apparatus according to the first embodiment of the invention. Features of the image signal processing apparatus will be described. The image signal processing apparatus according to the embodiment is applied to video display apparatuses such as television sets. A video display apparatus will be described as an example of the image signal processing apparatus in the following embodiments.

In FIG. 1, the image signal processing apparatus according to the embodiment includes an input section (1), a resolution conversion section (2), and a display section (3). The input section (1) is supplied with frame sequences of a moving image such as television broadcast signals, for example. The resolution conversion section (2) improves the resolution of frames supplied from the input section (1). The display section (3) displays an image based on the frames whose resolution is improved by the resolution conversion section (2). The input section (1) may include functions for channel selection, demodulation, and stream separation, as needed. The input section (1) may be equivalent to an input terminal that is supplied with video from the other devices. The display section (3) uses a plasma display panel, a liquid crystal display panel, or an electron/field emission display panel, for example. The resolution conversion section (2) will be described in detail.

A broadcasting station up-converts a video from SD to HD. An LSI chip at the receiving side converts the pixel size in a low-resolution video. The resolution conversion section (2) converts these videos into high-resolution videos. According to the example in FIG. 1, the video to be input to the input section (1) may be already up-converted from SD to HD in a broadcasting station. Alternatively, a video signal input to the input section (1) may be processed in a pixel size conversion section (107) so as to convert the pixel size and then input to the resolution conversion section (2). The following describes in detail a specific configuration and operations of the resolution conversion section (2).

In FIG. 1, frames #1 and #2 are input to a raw component extraction section (101). Using signals for these frames, the raw component extraction section (101) extracts a raw component (e.g., (301) in FIG. 3A) of the frame #1. The raw component extraction section (101) extracts raw components using a magnification scale (m/n) as information. The magnification scale (m/n) as information may be input via the input section (5) or may be previously stored in a storage section (108). Further, the magnification scale may be input along with the frames #1 and #2 contained in stream data.

Figure 3A:
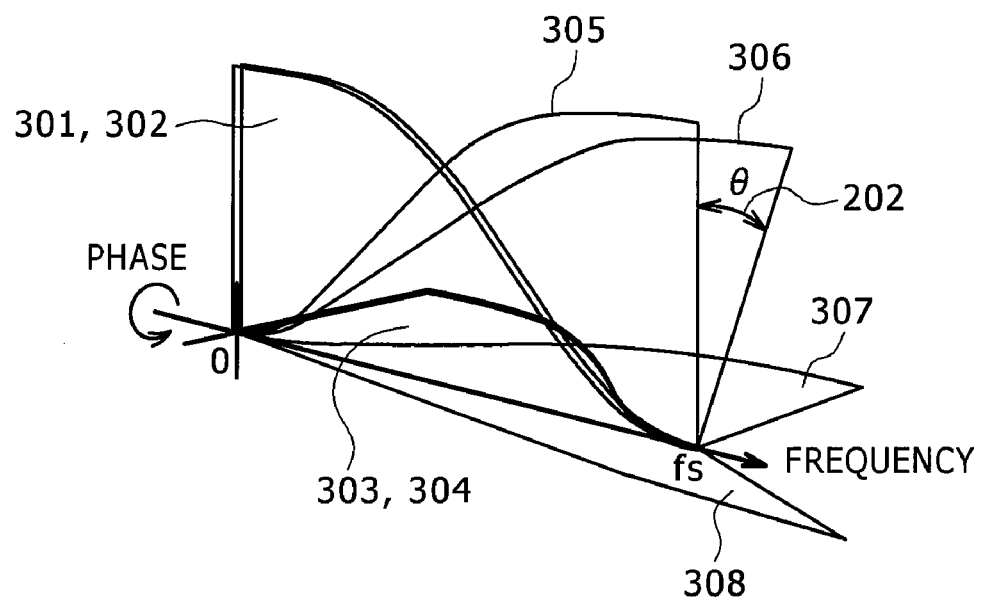
FIGS. 3A to 3C are explanatory diagrams showing operations according to the first embodiment of the invention.

An aliasing component extraction section (103) then extracts an aliasing component (e.g., (305) in FIG. 3A) of the frame #1. The aliasing component extraction section (103) can be embodied using a subtracter (102) so as to subtract an output signal of the raw component extraction section (101) from the signal for the frame #1 supplied to the raw component extraction section (101). A frequency conversion section (104) restores the extracted aliasing component of the frame #1 to the original high-pass component. A process of the frequency conversion section (104) uses a reference phase (δ) as information. The reference phase (δ) provides phase information that indicates a position in an image as the reference for a magnification process in the SD-HD conversion at the broadcasting station or the pixel size conversion process at the receiving side. The reference phase (δ) as information may be input from the input section (5) or may be previously stored in the storage section (108). Further, the reference phase (δ) may be input along with the frames #1 and #2 contained in stream data. An adder (105) then adds or mixes the high-pass component with the raw component to generate an output signal from a high-pass component reproduction section (106). A simple addition may be used as the addition or mixing process in the adder (105). The raw component and the high-pass component each may be multiplied by a coefficient and then may be added to each other. That is, any function may be used as long as it uses the raw component and the high-pass component as variables.

Figure 2:
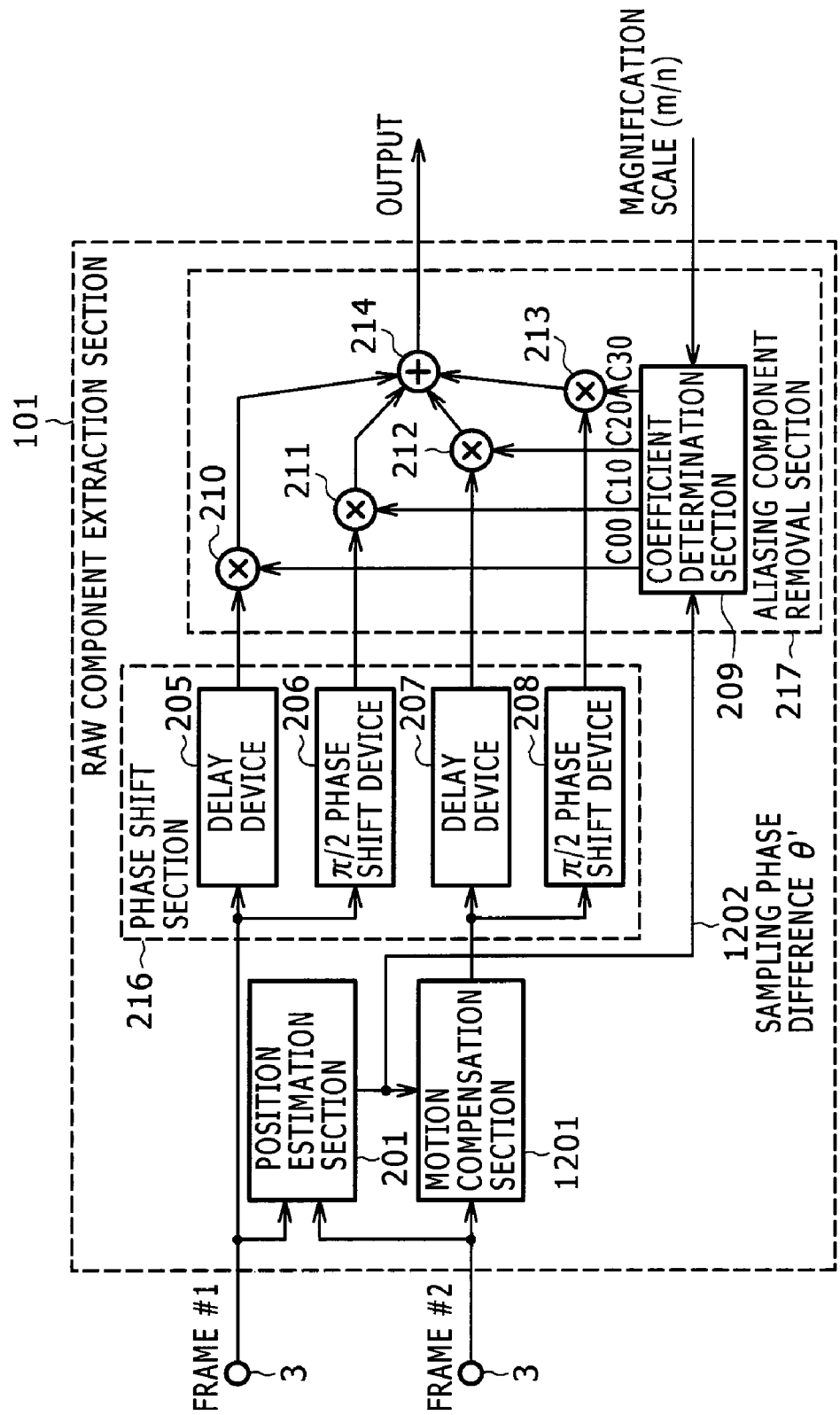
FIG. 2 is another explanatory diagram showing a configuration according to the first embodiment of the invention.

As shown in FIG. 2, the raw component extraction section (101) removes or decreases aliasing components without changing the pixel size. The following describes in detail operations of the raw component extraction section (101).

In FIG. 2, the raw component extraction section (101) is supplied with two image frames #1 and #2 from the input section (3). The raw component extraction section (101) removes or decreases aliasing components and outputs the raw component from which aliasing components are removed or reduced. The raw component extraction section (101) uses a position estimation section (201) and a phase shift section (216) to apply phase shift to image signals for the two input image frames and generates two signals from each of the image signals.

In this manner, four signals can be generated from signals for two input image frames. Based on a phase difference between the two input image frames, an aliasing component removal section (217) calculates a coefficient on a pixel basis so as to cancel the aliasing component in each of the four signals. Each of the four signals is assigned a pixel value for the corresponding pixel. The aliasing component removal section (217) calculates the sum of the pixel value and the pixel value multiplied by the coefficient for each of pixels in an image to be generated so as to generate a pixel value for a raw component image. The aliasing component removal section (217) can generate a raw component image by performing the process for pixels in the image to be generated. Consequently, two input image frames can be used to generate an image that contains a small number of aliasing components.

As mentioned above, the resolution conversion section (2) according to the embodiment aims to process signals for a low-resolution video whose pixel size is converted. An example of the low-resolution video is up-converted from SD to HD at the broadcasting station and is supplied to the input section (1). Another example thereof is supplied to the input section (1) and then is magnified by the pixel size conversion section (107) such as an LSI chip so as to increase the pixel size. For example, let us suppose that an input signal results from increasing the pixel size of the low-resolution video at an m/n magnification, where m and n are integers. It is assumed that relational expression fs=fs'*n/m holds between sampling frequency (fs) before pixel size conversion and sampling frequency (fs') after pixel size conversion. At this time, relational expression θ=θ'*n/m also holds between phase differences θ and θ' (1202). Phase difference θ is virtually estimated with reference to the sampling frequency (fs) before pixel size conversion. Phase difference θ' is actually estimated by the position estimation section (201) in the raw component extraction section (101) in FIG. 2 with reference to the sampling frequency (fs') after pixel size conversion.

The position estimation section (201) in FIG. 2 references a sampling phase (sampling position) of a pixel to be processed on the frame #1 supplied to the raw component extraction section (101) and estimates a corresponding pixel position on the frame #2. The position estimation section (201) finds a sampling phase difference θ' (1202) for each pixel based on the sampling frequency (fs') after the pixel size conversion. A motion compensation section (1201) aligns the frame #2 with the frame #1 in accordance with motion compensation. The phase shift section (216) and the aliasing component removal section (217) then remove or decrease an aliasing component.

Figure 3B:
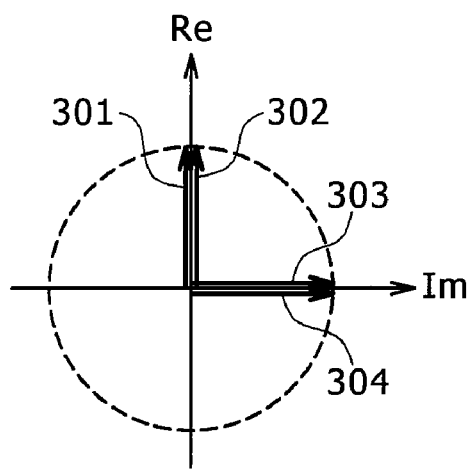
Figure 3C:
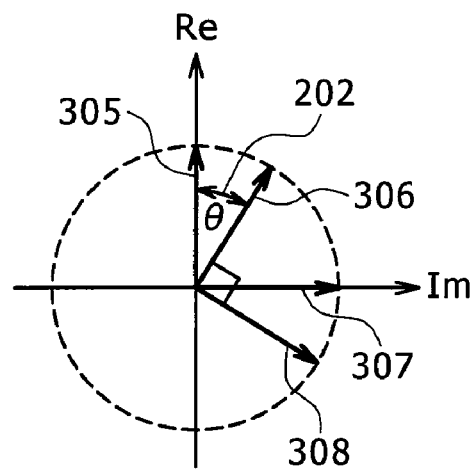

FIGS. 3A through 3C show relation between an aliasing component and a raw component in the above-mentioned operations of the raw component extraction section (101). Frequency fs in FIG. 3A denotes a sampling frequency before the pixel size conversion such as up-conversion. As mentioned above, it is assumed that relational expression fs=fs'*n/m holds between the frequency fs and the sampling frequency fs' after the pixel size conversion. FIG. 3A illustrates outputs from delay devices (205) and (207) and π/2 phase shift devices (206) and (208) using one-dimensional frequency domains. In FIG. 3A, signals for the frames #1 and #2 output from the delay devices (205) and (207) are respectively generated by adding raw components (301) and (302) to aliasing components (305) and (306) made from the original sampling frequency (fs). The phase of the aliasing component (306) rotates by a phase difference θ (202). The phase difference θ (202) is found as follows. The position estimation section (201) in FIG. 2 references a sampling phase (sampling position) of a pixel to be processed on the frame #1 supplied to the raw component extraction section (101) and estimates a corresponding pixel position on the frame #2. As a result, the position estimation section (201) finds the phase difference θ' (1202), i.e., a "shift quantity" between the corresponding pixels. The above-mentioned relational expression θ=θ'*n/m is used to convert the phase difference θ' (1202). A pixel interval or a sampling interval (2π) is then used to normalize the converted value.

Signals for the frames #1 and #2 output from the π/2 phase shift devices (206) and (208) are respectively generated by adding raw components (303) and (304) after the π/2 phase shift to aliasing components (307) and (308) after the π/2 phase shift. FIGS. 3B and 3C respectively show the raw component and the aliasing component so as to simplify the phase relation between the components in FIG. 3A.

Let us find the vector sum of the four components in FIG. 3B assuming a Re-axis component to be 1 and an Im-axis component to be 0. Further, let us find the vector sum of the four components in FIG. 3C and find a weighted sum by determining a coefficient to be multiplied by each component so that both Re-axis and Im-axis components are assumed to be 0. It is possible to cancel only the aliasing component and extract only the raw component.

Generally, a low-pass filter is used for the up-conversion from SD to HD at the broadcasting station or the pixel size conversion in the pixel size conversion section (107). Signal intensities vary with component frequencies in accordance with frequency characteristics of the low-pass filter. Signal intensities equally vary with frequencies between the raw components (301) and (302) or the aliasing components (305), (306), (307), and (308). A coefficient determination section (209) determines coefficients C00, C10, C20, and C30 using the phase difference (θ'*n/m) instead of the phase difference θ as conventionally used for the resolution conversion section (4). In this manner, aliasing components can be canceled.

The following describes how to determine the coefficients C00, C10, C20, and C30 generated by the coefficient determination section (209) with reference to FIGS. 13A through 13D.

FIGS. 13A through 13D show operations and examples of the coefficient determination section (209). As shown in FIG. 3A, the coefficient determination section (209) finds the vector sum of the four components in FIG. 3B assuming an Re-axis component to be 1 and an Im-axis component to be 0. In addition, the coefficient determination section (209) finds the vector sum of the four components in FIG. 3C and finds a weighted sum by determining a coefficient to be multiplied by each component so that both Re-axis and Im-axis components are assumed to be 0. It is possible to embody an image signal processing apparatus that uses only two frame images and extracts an image with few aliasing components in the one-dimensional direction.

As shown in FIG. 2, coefficient C00 is defined for an output from the delay device (205). The output is equivalent to the sum of the raw component and the aliasing component in the frame #1. Coefficient C10 is defined for an output from the π/2 phase shift device (206). The output is equivalent to the sum of results of π/2 phase shifting on the raw component and the aliasing component in the frame #1. The coefficient C20 is defined for an output from the delay device (207). The output is equivalent to the sum of the raw component and the aliasing component in the frame #2 whose motion is compensated by the position estimation section (201) and the motion compensation section (1201) on a pixel basis in decimal pixel precision with reference to the frame #1. The coefficient C30 is defined for an output from a Hilbert transform device (208). The output is equivalent to the sum of results of π/2 phase shifting on the raw component and the aliasing component in the frame #2 whose motion is compensated. As mentioned above, relational expression θ=θ'*n/m holds between phase differences θ and θ'. Phase difference θ is virtually estimated with reference to the sampling frequency (fs) before pixel size conversion. Phase difference θ' is actually estimated by the position estimation section (201) in the raw component extraction section (101) in FIG. 2 with reference to the sampling frequency (fs') after pixel size conversion. As shown in FIG. 13A, the following conditions need to be satisfied: (1) raw components along the Re axis sum up to 1; (2) raw components along the Im axis sum up to 0; (3) aliasing components along the Re axis sum up to 0; and (4) aliasing components along the Im axis sum up to 0. Under these conditions, the coefficient determination section (209) can yield simultaneous equations shown in FIG. 13B according to the phase relations between the components shown in FIGS. 3B and 3C using the phase difference θ with reference to the sampling frequency (fs) before the pixel size conversion. The simultaneous equations are solved to yield the results as shown in FIG. 13C. The coefficient determination section (209) outputs the coefficients C00, C10, C20, and C30 that satisfy any of the conditions shown in FIGS. 13A, 13B, and 13C.

As an example, FIG. 13D shows values of the coefficients C00, C10, C20, and C30 when the phase difference θ is varied from 0 to 2π in units of π/8 with reference to the sampling frequency (fs) before the pixel size conversion.

As mentioned above, the coefficient determination section (209) generates the coefficients C00, C10, C20, and C30. The aliasing component removal section (217) of the raw component extraction section (101) shown in FIG. 2 can cancel an aliasing component using the coefficients.

Overall operations of the resolution conversion section (2) in FIG. 1 will be described in comparison with a conventional technology of converting video signal resolutions.

The following describes an example of a conventional resolution conversion process for video signals with reference to FIGS. 4 and FIGS. 6A through 6E. The example below covers a case where a broadcasting station up-converts video from SD to HD.

Figure 4:
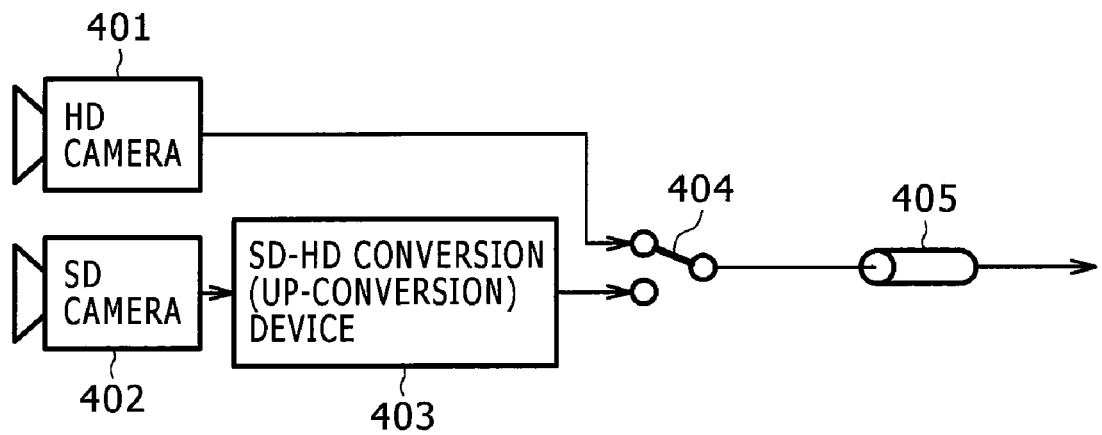
FIG. 4 is an explanatory diagram showing a resolution conversion process according to a conventional technology.

The present digital television broadcasting broadcasts programs using a terrestrial station, broadcasting satellite (BS), or communication satellite (CS) based on high definition (HD) image signals in addition to standard definition (SD) image signals. As shown in FIG. 4, not all programs use image signals captured by an HD camera (401). As is well known, an SD camera (402) captures an image signal. An SD-HD conversion device (403) up-converts the image signal into a signal having the same pixel size as the HD. The converted signal is switched at a switch (404) in accordance with programs or scenes and is output to a transmission channel (405). The transmission channel (405) is used for not only broadcasting, but also communication, storage (image recording), and signal processes such as image coding and multiplexing.

When an input image signal contains the already converted pixel size as mentioned above, the direct use of the conventional resolution conversion process as disclosed in Japanese Published Unexamined Patent Application No. 2007-324789 less effectively improves the resolution. The detail will be described.

Figure 5:
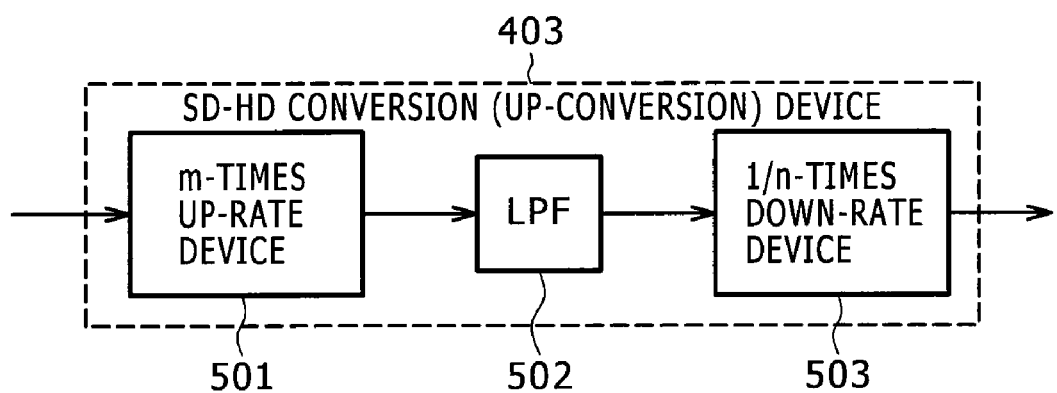
FIG. 5 is another explanatory diagram showing the resolution conversion process according to a conventional technology.

FIG. 5 shows a general configuration of the SD-HD conversion device (403). For example, let us consider a case of multiplying the pixel size by m/n, where m and n are integers. An up-rate device (501) first increases the rate by m. That is, the up-rate device (501) sequentially places input data in units of m pixels and inserts "0" into (m−1) intermediate pixels. The input data passes through a low-pass filter (502) having specific characteristics. A down-rate device (503) decreases the rate by 1/n. That is, the down-rate device (503) selects one pixel in units of n pixels at regular intervals and outputs the selected pixels in a manner of thinning. The SD-HD conversion device (403) performs this pixel size conversion process horizontally and vertically independently to convert a two-dimensional input image frame into any pixel size.

As an example operation, FIGS. 6A through 6E show frequency spectra for output signals from the components shown in FIG. 5 using horizontal magnification scale 8/3 (=1920/720) for converting an SD image into an HD image. In FIGS. 6A through 6E, a horizontal axis represents frequency f. A vertical axis represents a signal component intensity. An upward arrow (601) represents a position (frequency) of a sampling carrier (sine wave). A horizontal sampling frequency for the SD image is represented by fs. A horizontal sampling frequency for the SD image after the SD-HD conversion is represented by fs' (=8/3 fs).

Figure 6A:
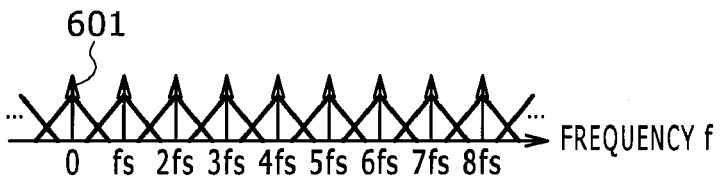
FIGS. 6A to 6E are the other explanatory diagrams showing the resolution conversion process according to a conventional technology.

FIG. 6A shows the frequency spectrum of an output signal from the SD camera (402). The frequency spectrum is assumed to originally contain a frequency component greater than or equal to the Nyquist frequency (=fs/2). The SD-HD conversion device (403) increases the rate eight times, allows the signal to pass the low-pass filter, and decreases the rate one third so as to horizontally magnify the signal 8/3 times.

Figure 6B:

FIG. 6B shows the frequency spectrum of an output signal from the 8-times up-rate device (501) in the SD-HD conversion device (403). The frequency spectrum indicates that a sampling carrier interval in FIG. 6A is expanded from fs to 8 fs.

Figure 6C:
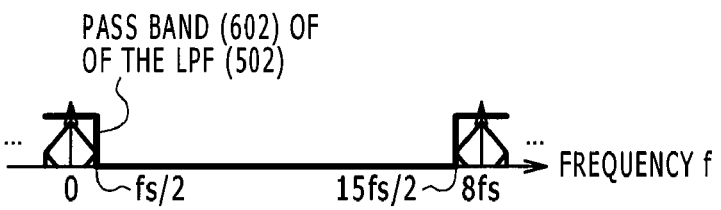

FIG. 6C shows the frequency spectrum of an output signal from the low-pass filter (502) in the SD-HD conversion device (403). Assuming that the low-pass filter (502) uses cutoff frequency fs/2, the signal contains frequency components only approximate to f=0 and f=8 fs as shown in FIG. 6C. The other frequency components are removed or reduced. At this time, frequency components greater than or equal to the Nyquist frequency remain as aliasing components.

Figure 6D:
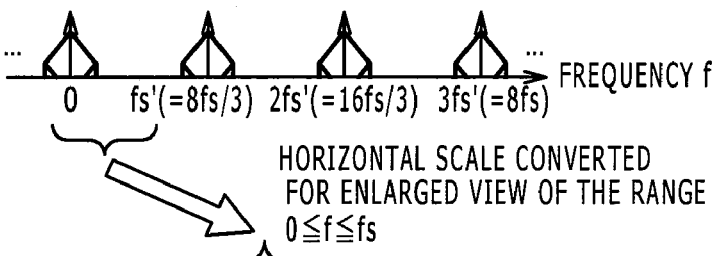
Figure 6D:
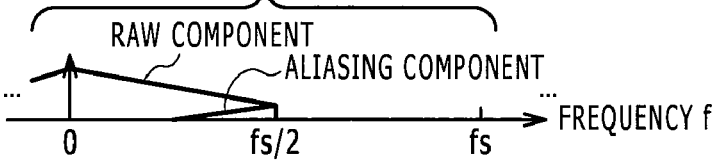

FIG. 6D shows the frequency spectrum of an output signal from the ⅓-times down-rate device (503) in the SD-HD conversion device (403). A new sampling carrier occurs at a position equal to the integral multiple of sampling frequency fs' (=8 fs/3) after the SD-HD conversion. The frequency spectrum shows that aliasing components passing through the low-pass filter (502) occur in the sampling carrier.

Figure 6E:

FIG. 6D' shows an enlarged view of the range $0 \leq f \leq fs$ for better viewing by changing the horizontal scale in FIG. 6D. FIG. 6D' represents the frequency spectrum of a signal flowing through the transmission channel (405) after the SD-HD conversion. The low-pass filter (502) reduces a frequency component greater than or equal to the Nyquist frequency (=fs/2) from the raw component shown in FIG. 6D'. The reduced frequency component disappears from the original position. This is a major difference from the frequency spectrum for the raw signal shown in FIGS. 3A through 3C. Even though the conventional resolution conversion process is straight applied to the signal, the aliasing component is just removed or reduced, resulting in the frequency spectrum as shown in FIG. 6E. It is impossible to reproduce the frequency component exceeding a pass band (602) of the low-pass filter (502). The resolution is improved less effectively.

With reference to FIGS. 7A through 7E, the following describes an example of the overall operation of the resolution conversion section (2) in FIG. 1.

The example assumes the following. According to the configuration in FIG. 4, the SD camera (402) supplies a signal to the SD-HD conversion device (403) that up-converts the signal 8/3 times. The up-converted signal is input to the resolution conversion section (2). Operations of the sections in the resolution conversion section (2) are described below.

FIG. 7A shows the frequency spectrum of an input signal to the resolution conversion section (2). The frequency spectrum is the same as that shown in FIG. 6D used for the description of the operations according to the conventional technology mentioned above. In FIG. 7A, fs denotes the sampling frequency before the 8/3 up-conversion. A high-pass component exceeding the fs/2 frequency is eliminated by the low-pass filter (502) and is converted into an aliasing component at fs/2 as a symmetric axis. The high-pass component may remain depending on filter characteristics. The remaining component is negligible for the operation of the embodiment and its illustration and description are omitted.

The raw component extraction section (101) shown in FIG. 1 is supplied with the signal in FIG. 7A, removes or reduces aliasing components from the input signal, and outputs the signal in FIG. 7B. The aliasing component extraction section (103) subtracts the signal in FIG. 7B from the signal in FIG. 7A and outputs the signal in FIG. 7C.

The frequency conversion section (104) in FIG. 1 folds the signal in FIG. 7C toward a higher band at fs/2 as a symmetric axis and outputs the signal so as to resume the original frequency spectrum. The configuration and operations of the frequency conversion section (104) will be described later in detail.

The high-pass component reproduction section (106) adds the signal in FIG. 7B and the signal in FIG. 7D to generate the signal in FIG. 7E that is output from the resolution conversion section (2). The resolution conversion section (2) can reproduce a higher frequency component than the spectrum in FIG. 6E used for the description of the conventional technology.

FIG. 8 shows an example of the configuration of the frequency conversion section (104). As mentioned above, the frequency conversion section (104) inverts the low-band and high-band portions of the frequency spectrum for the input signal at fs/2 as a symmetric axis to resume the original frequency spectrum and outputs the signal. For embodying this operation, it is generally known to use a carrier generator (803) that generates a sine wave $\cos(2\pi fs^*t+\delta)$ having 1/fs as one cycle and amplitude 1. A multiplier (801) multiplies an input signal by the carrier. A low-pass filter (802) removes or reduces unnecessary frequency components.

Figure 9A:
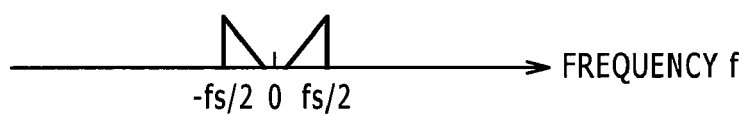
FIGS. 9A to 9E are explanatory diagrams showing an operation according to the first embodiment of the invention.
Figure 9B:
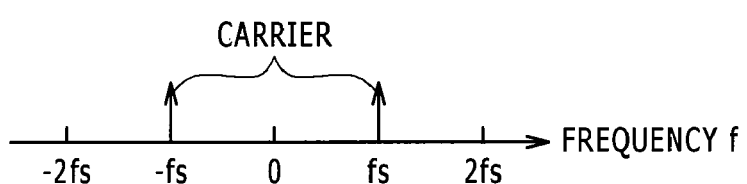
Figure 9C:
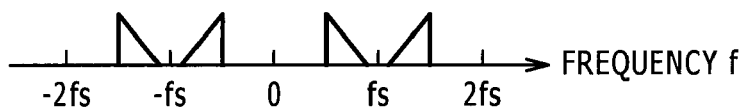
Figure 9D:
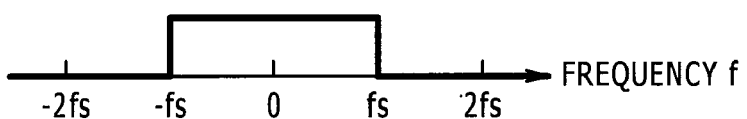
Figure 9E:
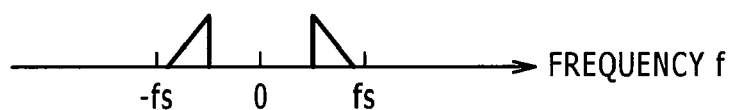

Operations of the frequency conversion section (104) will be described in detail with reference to FIGS. 9A through 9E. FIG. 9A shows the frequency spectrum of an input signal to the frequency conversion section (104), i.e., the frequency spectrum of an output signal from the aliasing component extraction section (103). The frequency spectrum is the same as that shown in FIG. 7C. FIG. 9B shows the frequency spectrum of the carrier for inverting frequencies. The frequency spectrum is equivalent to a line spectrum with the frequency ±fs because the carrier is a sine wave having 1/fs as one cycle. FIG. 9C shows the frequency spectrum of an output signal from the multiplier (801). As a result, the signals in FIGS. 9A and 9B make aliasing components in the frequency domain. FIG. 9D shows the pass band of the low-pass filter (802). The pass band is used to pass only frequency components in the range of $-fs \leq f \leq fs$ for the signal shown in FIG. 9C. FIG. 9E shows the frequency spectrum of an output from the low-pass filter (802). As a result, the low and high bands are inverted in the frequency spectrum of the input signal shown in FIG. 9A at fs/2 as a symmetric axis. Obviously, the same effect is available when a band-pass filter is used instead of the low-pass filter (802) to pass only the frequency component as shown in FIG. 9E.

In FIG. 7E, the raw component needs to be correctly concatenated with the high-pass component reproduced from the aliasing component including the phases. For this purpose, relation shown in FIGS. 10A through 10C needs to be maintained among a reference phase ($\delta$) of the carrier generated from the above-mentioned carrier generator (803) and pixel positions before and after the magnification. The detail will be described below.

Figure 10A:
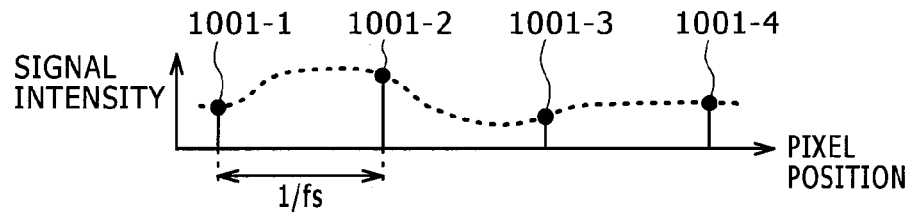
FIGS. 10A to 10C are explanatory diagrams showing an operation according to the first embodiment of the invention.
Figure 10B:
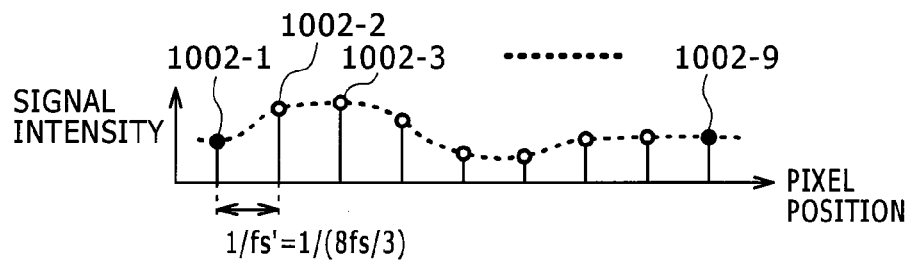
Figure 10C:
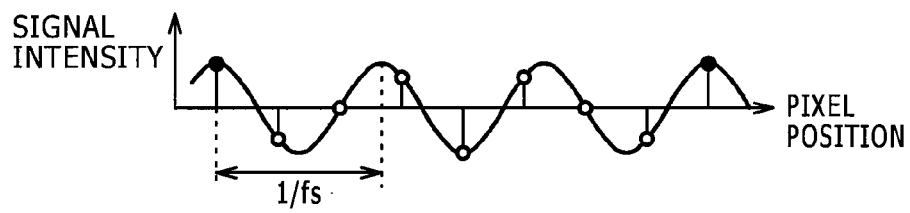

Similarly to the above-mentioned example according to the configuration shown in FIG. 4, the SD camera (402) supplies a signal to the SD-HD conversion device (403) that up-converts the signal 8/3 times. FIGS. 10A through 10C show positional relation between a signal before magnification; a signal after magnification; and a carrier signal, respectively. In FIG. 10A, the signal before magnification is assumed to contain pixels (1001-1), (1001-2), (1001-3), and (1001-4). The signal after magnification by 8/3 is assumed to contain pixels (1002-1), (1002-2), (1002-3), . . . , and (1002-9) as positioned in FIG. 10B. That is, the signal is assumed to be magnified so as to ensure a positional match between the pixels (1001-1) and (1002-1) and between the pixels (1001-4) and (1002-9). The position for the pixels (1001-1) and (1002-1) and the position for the pixels (1001-4) and (1002-9) are assumed to be reference phases. The carrier signal (cos) shown in FIG. 10C is configured to yield phase 0. Under these conditions, the carrier signal results in value 1 (cos 0) at the reference phases. It is possible to ensure a match between the phase of an output from the frequency conversion section (104) shown in FIG. 8, i.e., the phase of a high-pass component reproduced from the aliasing component shown in FIG. 7D, and the phase of the raw component shown in FIG. 7B.

The operation shown in FIGS. 9A through 9E does not take into consideration an effect of the sampling frequency (fs') after the pixel size conversion. A generally known oversampling technology can solve this issue. The sampling frequency (fs') after the pixel size conversion may newly generate an aliasing component that causes the frequency spectrum to partially overlap and prevents the intended component as shown in FIG. 9E from being reproduced. In such case, the sampling frequency or the pixel size is converted from fs' to another sampling frequency fs" that is fully higher than the sampling frequencies fs and fs' (fs">>fs and fs">>fs'). The operation shown in FIGS. 9A through 9E is then performed to reconvert the sampling frequency from fs" to fs'. In this manner, the frequency can be inverted as mentioned above.

As an example, Japanese Published Unexamined Patent Application No. Hei 1-292904 discloses the technology that improves the above-mentioned oversampling technology and converts frequencies by multiplying multiple sine waves. This technology solves problems resulting from a method of multiplying a sine wave and using a filter. As a problem, for example, a real signal process makes it impossible to distinguish between positive and negative frequencies to shift a wide-band signal by a small quantity of frequencies. As another problem, an aliasing component due to sampling makes it necessary to shift the frequency twice separately. Since the disclosed technology converts frequencies by multiplying multiple sine waves, a single process can convert the frequency to reduce constituent components even when the real signal process causes a sum signal and a difference signal to overlap with each other in a wide-band signal or when the sampling folds a signal.

Figure 11:
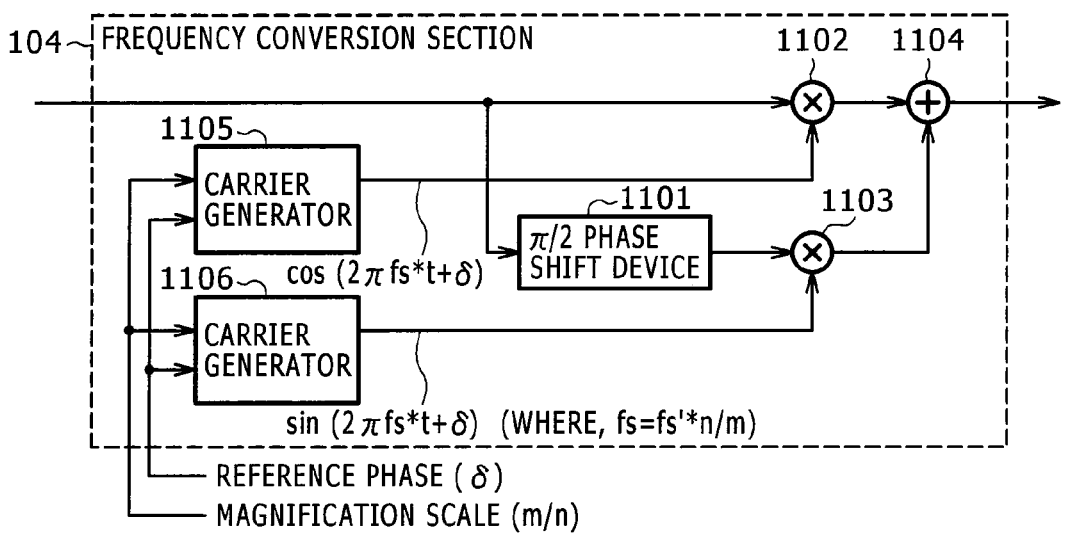
FIG. 11 is an explanatory diagram showing another configuration according to the first embodiment of the invention.

FIG. 11 shows an example of the configuration of the frequency conversion section (104) using the technology described in Japanese Published Unexamined Patent Application No. Hei 1-292904. The configuration shown in FIG. 8 cannot distinguish between positive and negative frequencies in the carrier (cosine wave) generated from the carrier generator (803). According to the configuration in FIG. 11, carrier generators (1105) and (1106) can simultaneously generate a cosine wave and a sine wave whose phase differs from the cosine wave by $\pi/2$ (i.e., orthogonal to the cosine wave). A $\pi/2$ phase shift device (1101) generates an orthogonal component of the input signal. Multipliers (1102) and (1103), and an adder (1104) simultaneously invert the frequency and remove or reduce an obstructive aliasing component resulting from the above-mentioned sampling. The operation is described in detail in Japanese Published Unexamined Patent Application No. Hei 1-292904 and the description is omitted for simplicity. The $\pi/2$ phase shift device (1101) may be simply replaced by the Hilbert transform device described in Japanese Published Unexamined Patent Application No. 2007-324789.

While there has been described the example in which an input signal contains an aliasing component in the horizontal direction, the present invention is not limited thereto. Obviously, the invention is applicable when an input signal contains an aliasing component in a vertical direction or a time direction as well as in a two-dimensional or three-dimensional direction. In this case, a filter, a phase shift, and a carrier (sine wave) used for sections may be appropriately modified in accordance with the direction along which an aliasing component occurs. When the input signal contains an aliasing component in the vertical direction, for example, it may be preferable to use a vertical filter, a vertical phase shift, and a carrier having a vertical frequency. Let us consider a process (IP conversion) that converts an interlace-scanning signal into a progressive-scanning signal. The process is equivalent to an up-conversion process that doubles the pixel size (number of scanning lines) in the vertical direction. An IP-converted signal may be used as the input image frame for the image signal processing apparatus according to the first embodiment. Values m=2 and n=1 may be assigned to the above-mentioned magnification scale m/n, where m and n are integers. In this manner, a vertical resolution conversion process can be embodied. Let us consider that a signal is converted from 480i (interlace) to 1080p (progressive). In this case, a vertical magnification scale is 4.5 (i.e., 1080/(480/2)). Relation fs'=9 fs/2 holds between sampling frequency fs before the pixel size conversion and sampling frequency fs' after the pixel size conversion as mentioned above.

Examples of the conventional resolution conversion process for video signals have been described with reference to FIGS. 4 through 6E. Operation and configuration examples of the resolution conversion section (2) according to the embodiment have been described with reference to FIGS. 7A through 11. In either case, the broadcasting station up-converts video from SD to HD. The pixel size of video may be also converted in the receiving side, i.e., the pixel size conversion section (107) of an image signal processing section according to the embodiment. In this case, the only difference is the receiving side, not the broadcasting station, that converts the resolution. The other description is the same as that about the broadcasting station.

The image signal processing apparatus according to the first embodiment provides an effect of appropriately improving even the resolution of an image signal whose pixel size is previously converted.

<Second Embodiment>

The second embodiment of the invention will be described with reference to FIGS. 12 through 15D. The second embodiment uses another configuration for operations equivalent to those of the resolution conversion section (2) according to the first embodiment. The following describes in detail the specific configuration and operations.

Figure 12:
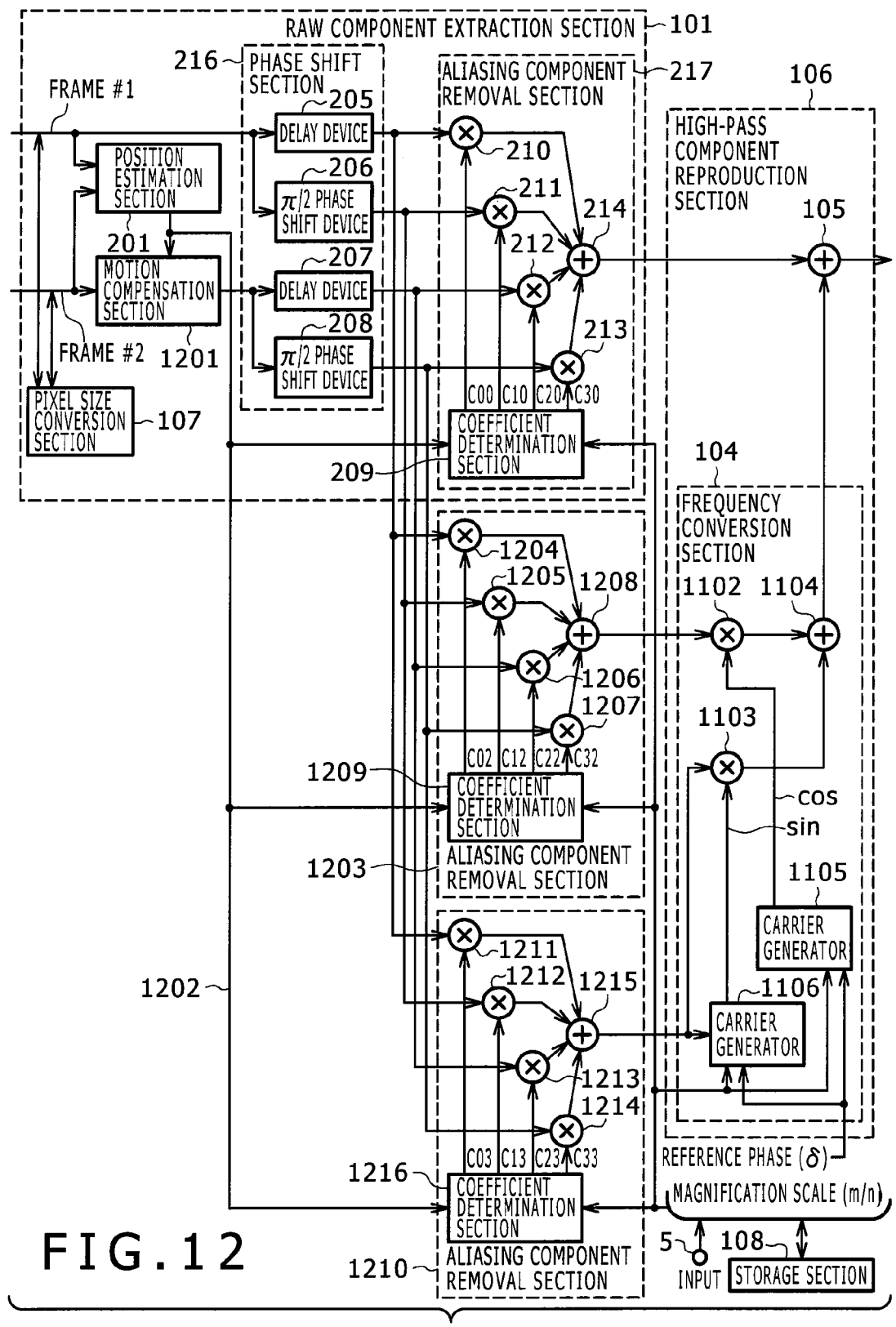
FIG. 12 is an explanatory diagram showing a configuration according to a second embodiment of the invention.

Operations of the sections in the raw component extraction section (101) in FIG. 12 are the same as the counterparts according to the first embodiment and the description is omitted for simplicity. Folded component extraction sections (1203) and (1210) are configured similarly to the aliasing component removal section (217). A coefficient determination section (1209) generates coefficients C02, C12, C22, and C32. A coefficient determination section (1216) generates coefficients C03, C13, C23, and C33. By configuring these coefficients to be described later, the aliasing component extraction sections (1203) and (1210) extract aliasing components so that these sections output signals whose phases are orthogonal to each other. That is, an output from the aliasing component extraction section (1203) approximately equals an aliasing component output from the subtracter (102) shown in FIG. 1 according to the first embodiment. An output from the aliasing component extraction section (1210) approximately equals an aliasing component output from the $\pi/2$ phase shift device (1101) shown in FIG. 11 according to the first embodiment. The frequency conversion section (104) and the high-pass component reproduction section (106) are configured equally to the sections shown in FIGS. 11 and 1 according to the first embodiment and the description is omitted for simplicity.

With reference to FIGS. 13A through 15D, the following describes how to determine coefficients C00, C10, C20, C30, C02, C12, C22, C32, C03, C13, C23, and C33 generated by the coefficient determination sections (209), (1209), and (1216).

Operations of the coefficient determination section (209) for determining coefficients are similar to those shown in FIG. 13 according to the first embodiment and the description is omitted for simplicity.

FIGS. 14A through 14C show operations and examples of the coefficient determination section (1209). The coefficient determination section (1203) can yield simultaneous equations as shown in FIG. 14B by: (1) assigning 0 to the sum of raw components along the Re axis; (2) assigning 0 to the sum of raw components along the Im axis; (3) assigning 1 to the sum of aliasing components along the Re axis; and (4) assigning 0 to the sum of aliasing components along the Im axis as shown in FIG. 14A. Solving the simultaneous equations can derive coefficients C02, C12, C22, and C32 as shown in FIGS. 14C and 14D for extracting only a signal corresponding to the Re axis for aliasing components.

FIGS. 15A through 15C show operations and examples of the coefficient determination section (1209). Similarly, the coefficient determination section (1216) can yield simultaneous equations as shown in FIG. 15B by: (1) assigning 0 to the sum of raw components along the Re axis; (2) assigning 0 to the sum of raw components along the Im axis; (3) assigning 0 to the sum of aliasing components along the Re axis; and (4) assigning 1 to the sum of aliasing components along the Im axis as shown in FIG. 15A. Solving the simultaneous equations can derive coefficients C03, C13, C23, and C33 as shown in FIGS. 15C and 15D for extracting only a signal corresponding to the Re axis for aliasing components.

Using the coefficients found as mentioned above, the aliasing component extraction sections (1203) and (1210) generate outputs (aliasing components) whose phases are orthogonal to each other. Accordingly, it is possible to eliminate the $\pi/2$ phase shift device (1101) in the frequency conversion section (104) shown in FIG. 11. The frequency conversion section (104) in FIG. 12 can provide the above-mentioned frequency conversion operation by directly supplying the multipliers (1102) and (1103) with outputs from the aliasing component extraction sections (1203) and (1216).

As seen from FIGS. 13A through 15C, the sets of coefficients (C00, C10, C20, C30), (C02, C12, C22, C32), and (C03, C13, C23, C33) only differ in alignment sequences with reference to the same phase difference θ. The circuit may be simplified by unifying the coefficient determination sections (209), (1209), and (1216) in FIG. 12. FIGS. 13A through 14C show relations C02=1−C00, C12=−C10, C22=−C20, and C32=−C30, yielding such relation as (sum of aliasing components corresponding to the Re axis)=(frame #1 signal)−(sum of raw components corresponding to the Re axis). Accordingly, the subtracter (102) of the aliasing component extraction section (103) shown in FIG. 1 can be used to reduce an output signal of the aliasing component removal section (217) from an output of the delay device (205). The resulting signal can replace an output signal of the aliasing component extraction section (1203) so that the section (1203) may be simplified.

The equations shown in FIGS. 13A through 15C can be integrated into a matrix operation equation as shown in FIG. 16A. Submatrices (1601), (1602), and (1603) at the left-hand side in FIG. 16A represent right-hand side values in FIGS. 13A, 14A, and 15A. A matrix (1604) as the first term at the right-hand side in FIG. 16A represents coefficients to be multiplied by the coefficients C00, C10, C20, C30, C02, C12, C22, C32, C03, C13, C23, and C33 at the left-hand sides in FIGS. 13A through 15C. Submatrices (1605), (1606), and (1607) as the second term at the right-hand side in FIG. 16A are identical to the coefficients C00, C10, C20, C30, C02, C12, C22, C32, C03, C13, C23, and C33. Solving the matrix operation equation can yield coefficients as shown in FIG. 16B. Depending on a value of the phase difference θ, solutions for the coefficients may become indeterminate, making the matrix operation equation unsolvable. To solve this problem, the coefficient C00 may be forcibly assigned 1 to zero the other coefficients C10, C20, C30, C02, C12, C22, C32, C03, C13, C23, and C33. This aims at directly outputting the signal for the frame #1 input to the resolution conversion section (2).

The image signal processing apparatus according to the second embodiment provides additional effects as well as the effect of the image signal processing apparatus according to the first embodiment. The frequency conversion section does not require oversampling or $\pi/2$ phase shifting (Hilbert transform) for preventing an unneeded obstructive aliasing component due to sampling. It is possible to reduce constituent components or shorten the process time such as delay time resulting from the oversampling or the $\pi/2$ phase shifting.

<Third Embodiment>

The third embodiment of the invention uses a raw component extraction section (2014) shown in FIG. 20 instead of the raw component extraction section (101) in the configuration of the image signal processing apparatus as shown in FIG. 1. The embodiment provides the image signal processing apparatus that improves the resolution using three input frame images.

Figure 17A:
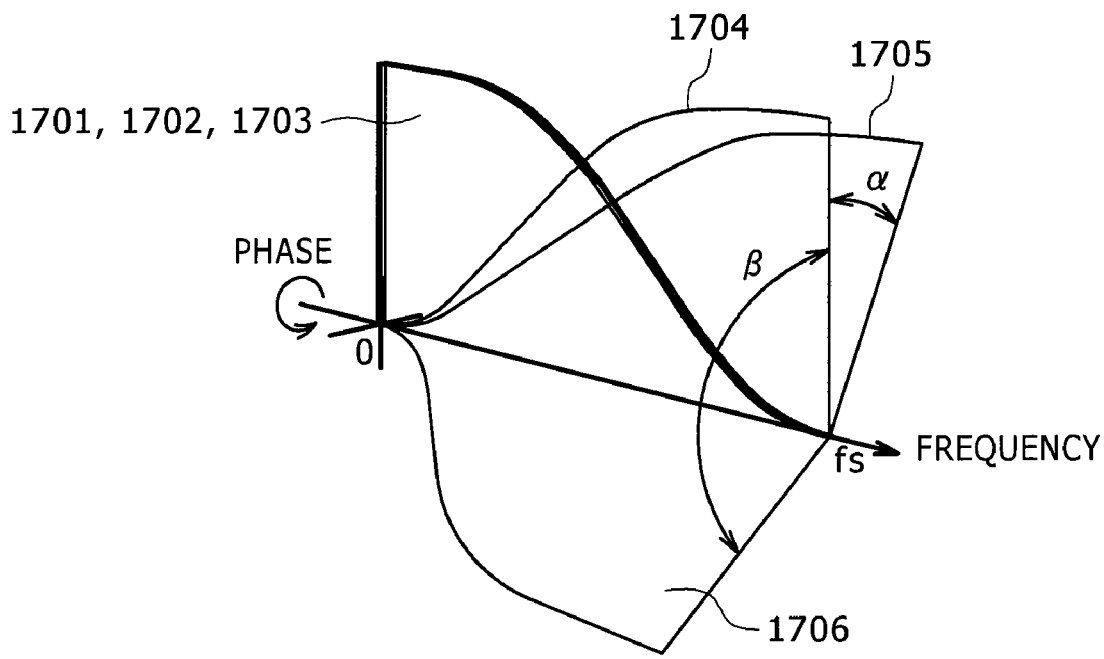
FIGS. 17A to 17C are explanatory diagrams showing operations according to a conventional technology.
Figure 17B:
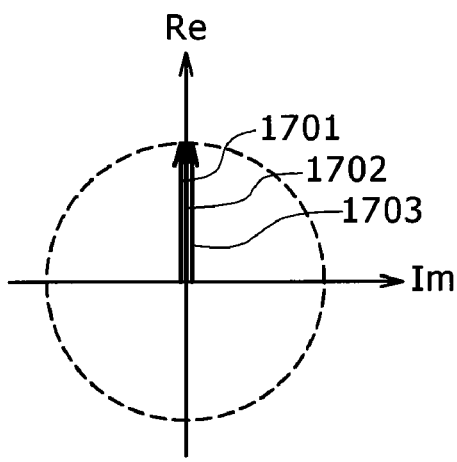
Figure 17C:
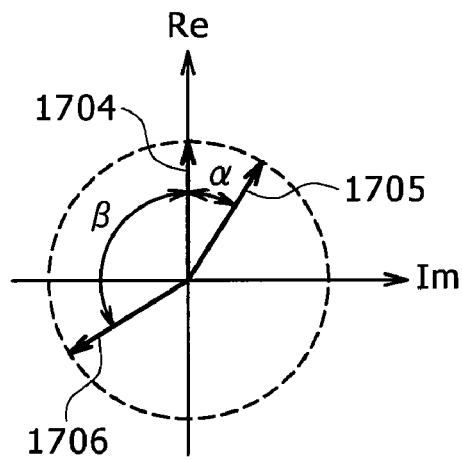

Operations of the raw component extraction section (2014) provide an improvement of the technology described in Japanese Published Unexamined Patent Application No. Hei 8-336046. Operations of the conventional technology described in Japanese Published Unexamined Patent Application No. Hei 8-336046 will be first described with reference to FIGS. 17A through 17C. As shown in FIGS. 17A through 17C, the technology described in Japanese Published Unexamined Patent Application No. Hei 8-336046 cancels aliasing components using signals for three frames #1, #2, and #3 to extract only raw signals (1701), (1702), and (1703). The frame #1 contains an aliasing component (1704). The phase of the aliasing component (1704) is used as a reference to estimate a phase difference α for an aliasing component (1705) in the frame #2 and a phase difference β for an aliasing component (1706) in the frame #3 on a pixel basis. Solving a matrix operation equation as shown in FIG. 18 yields coefficients C00, C10, and C20 to be multiplied by signals for the frames #1, #2, and #3. A signal for the frame #1 is equivalent to the sum of a raw component (1701) and an aliasing component (1704). A signal for the frame #2 is equivalent to the sum of a raw component (1702) and an aliasing component (1705). A signal for the frame #3 is equivalent to the sum of a raw component (1703) and an aliasing component (1706). The coefficients C00, C10, and C20 are multiplied by the signals for the frames #1, #2, and #3 to yield a weighted sum. The aliasing components (1704), (1705), and (1706) are canceled to extract only the raw components (1701), (1702), and (1703). The operation is described in detail in Japanese Published Unexamined Patent Application No. Hei 8-336046 and the detailed description is omitted for simplicity.

The conventional technology described in Japanese Published Unexamined Patent Application No. Hei 8-336046 as well as the conventional technology described in Japanese Published Unexamined Patent Application No. 2007-324789 only provides an effect of removing or reducing aliasing components. The conventional technologies less effectively improve the resolution.

The raw component extraction section (2014) shown in FIG. 20 according to the third embodiment of the invention allows the signal for the input frame #1 to pass through a delay device (2001) and supplies the signal to an aliasing component removal section (2013). A position estimation section (2002) uses the signal for the input frame #2 to find a phase difference α' (2011) between corresponding pixels in the frames #2 and #1, namely, the "shift quantity" between corresponding pixels, on a pixel basis. A motion compensation section (2003) then generates a signal by compensating the shift quantity in the decimal pixel precision and supplies the signal to the aliasing component removal section (2013). Similarly, a position estimation section (2004) uses the signal for the input frame #3 to find a phase difference β' (2012) between corresponding pixels in the frames #3 and #1, namely, the "shift quantity" between corresponding pixels, on a pixel basis. A motion compensation section (2005) then generates a signal by compensating the shift quantity in the decimal pixel precision and supplies the signal to the aliasing component removal section (2013). Like the first embodiment, there is no need for an up-rate (wide-band interpolation) as described in Japanese Published Unexamined Patent Application No. Hei 8-336046. It is also unnecessary to interpolate pixels (sampling points) and densify image data.

The aliasing component removal section (2013) converts the phase differences α' and β' into phase differences α and β that are estimated with reference to sampling frequency fs before the pixel size conversion. A coefficient determination section (2006) determines the coefficients C00, C10, and C20 on a pixel basis. Multipliers (2007), (2008), (2009), and an adder (2010) are used to yield a weighted sum of the signals. In this manner, aliasing components are removed or reduced to generate an output from the raw component extraction section (2014).

The phase differences α and β used for the coefficient determination section (2006) are estimated with reference to the sampling frequency fs before the pixel size conversion for increasing the pixel size m/n times, where m and n are integers. The phase differences α' and β' are estimated with reference to the sampling frequency fs' after the pixel size conversion. Relational expressions α=α'*n/m and β=β'*n/m hold between the phase differences α, β, α', and β'. The phase differences α and β can be used to determine the coefficients C00, C10, and C20 using the matrix operation equation shown in FIG. 18 similarly to the conventional technology.

The image signal processing apparatus according to the third embodiment can directly use an output (raw component) from the raw component extraction section (2014) as an output (raw component) from the raw component extraction section (101) shown in FIG. 1. The resolution conversion section (2) shown in FIG. 1 includes not only the raw component extraction section (101) but also the aliasing component extraction section (103) and the high-pass component reproduction section (106). Configurations and operations of the sections (103) and (106) are the same as those of the image signal processing apparatus according to the first embodiment and the description is omitted for simplicity.

The image signal processing apparatus according to the third embodiment can reduce aliasing components, reproduce high-frequency components, and generate high-resolution images using three images contained in low-resolution video having the pixel size converted in the preceding process such as video up-converted from SD to HD at a broadcasting station.

<Fourth Embodiment>

The fourth embodiment of the invention will be described with reference to FIGS. 19A, 19B, and 21. The fourth embodiment provides another configuration of operations equivalent to those of the resolution conversion section (2) according to the third embodiment. The following describes in detail a specific configuration and operations of the fourth embodiment.

The resolution conversion section (2) extends the matrix operation equation shown in FIG. 18 according to the third embodiment to a matrix operation equation shown in FIG. 19A. The resolution conversion section (2) then finds coefficients C00, C10, C20, C01, C11, C21, C02, C12, and C22 as shown in FIG. 19B. A submatrix (1801) at the left-hand side of FIG. 19A indicates that: (1) the sum of raw components for the Re axis is set to 1; (2) the sum of aliasing components for the Re axis is set to 0; and (3) the sum of aliasing components for the Im axis is set to 0. Similarly, a submatrix (1901) at the left-hand side of FIG. 19A indicates that: (1) the sum of raw components for the Re axis is set to 0; (2) the sum of aliasing components for the Re axis is set to 1; and (3) the sum of aliasing components for the Im axis is set to 0. A submatrix (1902) at the left-hand side of FIG. 19A indicates that: (1) the sum of raw components for the Re axis is set to 0; (2) the sum of aliasing components for the Re axis is set to 0; and (3) the sum of aliasing components for the Im axis is set to 1. A matrix (1802) as the first term at the right-hand side in FIG. 19A is identical to a matrix (1802) in FIG. 18. The phase differences α and β are estimated with reference to the sampling frequency fs before the pixel size conversion for increasing the pixel size m/n times, where m and n are integers. The phase differences α' and β' are estimated with reference to the sampling frequency fs' after the pixel size conversion. Relational expressions α=α'*n/m and β=β'*n/m hold between the phase differences α, β, α', and β'.

The resolution conversion section (2) multiplies the coefficients C00, C10, C20, C01, C11, C21, C02, C12, and C22 found as shown in FIG. 19B by signals for the frames #1, #2, and #3 after motion compensation. In this manner, the resolution conversion section (2) can extract the sum of raw components for the Re axis, the sum of aliasing components for the Re axis, and the sum of aliasing components for the Im axis.

Figure 21:
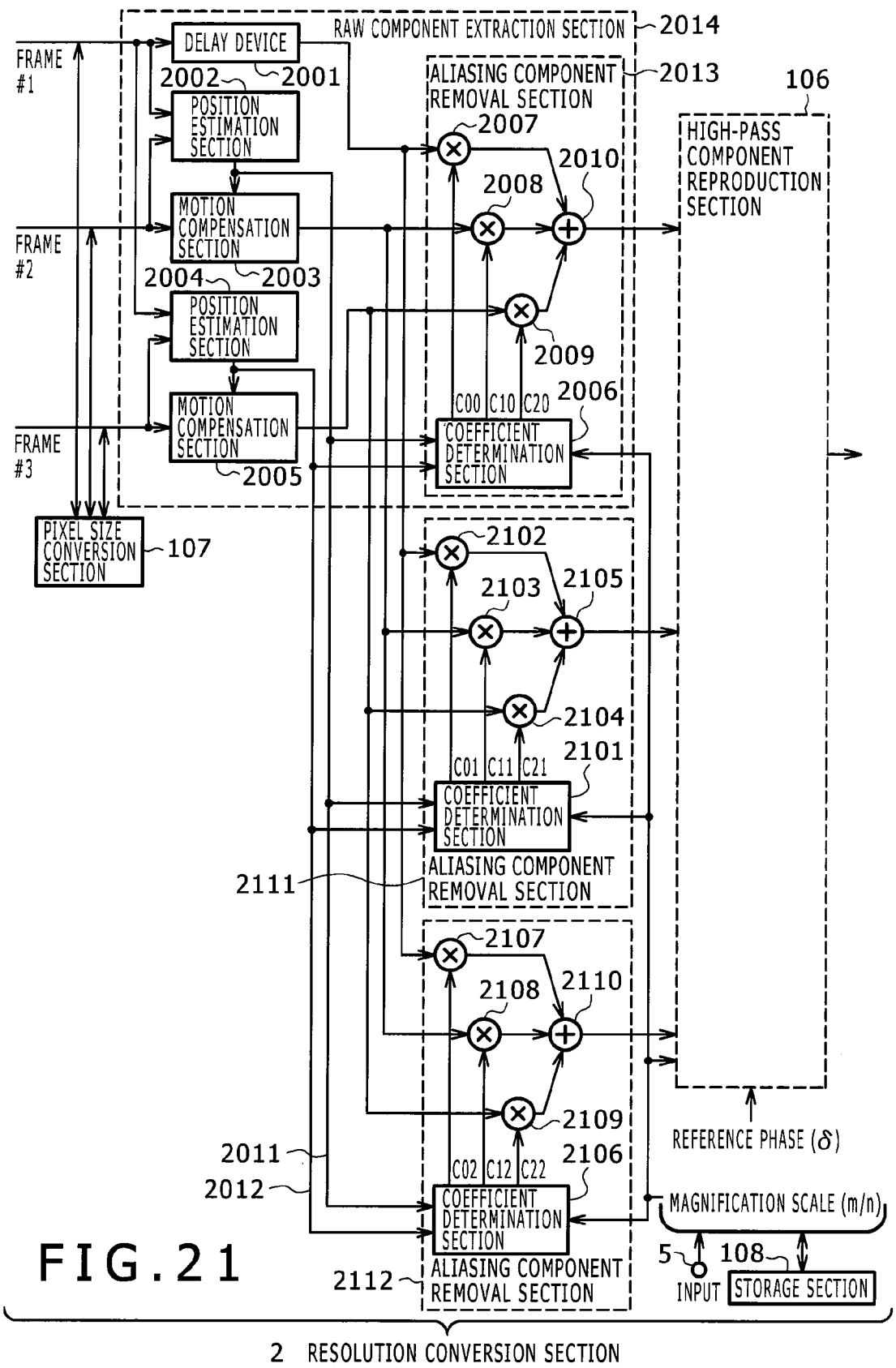
FIG. 21 is an explanatory diagram showing a configuration according to a fourth embodiment of the invention.

FIG. 21 shows a configuration of the resolution conversion section (2) according to the fourth embodiment. In FIG. 21, the raw component extraction section (2014) multiplies the coefficient C00, C10, and C20 found as shown in FIG. 19B by the signals for the frames #1, #2, and #3 and extracts the sum of raw components for the Re axis. Operations of the constituent sections in the raw component extraction section (2014) are the same as those thereof shown in FIG. 20 according to the third embodiment and the description is omitted for simplicity.

An aliasing component extraction section (2111) in FIG. 21 uses multipliers (2102), (2103), (2104), and an adder (2105) to multiply coefficients C01, C11, and C21 found as shown in FIG. 19B by signals for the frames #1, #2, and #3 and extracts the sum of aliasing components for the Re axis.

Similarly, an aliasing component extraction section (2112) in FIG. 21 uses multipliers (2107), (2108), (2109), and an adder (2110) to multiply coefficients C02, C12, and C22 found as shown in FIG. 19B by signals for the frames #1, #2, and #3 and extracts the sum of aliasing components for the Im axis.

The high-pass component reproduction section (106) shown in FIG. 12 according to the second embodiment is supplied with the sum of raw components for the Re axis, the sum of aliasing components for the Re axis, and the sum of aliasing components for the Im axis extracted as mentioned above. Finally, a high-resolution signal is output. Operations of the high-pass component reproduction section (106) are the same as those thereof according to the second embodiment and the description is omitted for simplicity.

As seen from FIG. 19B, valid relations are C01=1−C00, C11=−C10, and C21=−C20. Similarly to the aliasing component extraction section (103) shown in FIG. 1, the sum of aliasing components for the Re axis may result from subtracting the raw component, i.e., the output from the adder (2010), from the input signal for the frame #1, i.e., the output from the delay device (2001), instead of using the aliasing component extraction section (2111) shown in FIG. 21.

The image signal processing apparatus according to the fourth embodiment provides additional effects as well as the effect of the image signal processing apparatus according to the third embodiment. The frequency conversion section does not require oversampling or $\pi/2$ phase shifting (Hilbert transform) for preventing an unneeded obstructive aliasing component due to sampling. It is possible to reduce constituent components or shorten the process time such as delay time resulting from the oversampling or the $\pi/2$ phase shifting.

It may be preferable to use parameters for the magnification scale (m/n) and the reference phase ($\delta$) in the embodiments of the invention. A transmitter may transmit the parameters to a receiver in association with video signals such as the frames #1, #2, and #3.

Further, for example, it may be preferable to predetermine the magnification scale (m/n) and the reference phase ($\delta$) so that both ensure specified consistent values between the transmitting and receiving sides. The values may be prestored in a storage section. The transmitter and the receiver may use the specified values stored in the storage section. The transmitter and the receiver need not transmit or receive the magnification scale (m/n) and the reference phase ($\delta$). The receiver need not detect these values.

The receiving side may not be able to detect or reproduce the magnification scale (m/n) or the reference phase ($\delta$). In such case, the resolution conversion process may be disabled and an input signal for the frame #1 may be directly output as an output signal from the image signal processing apparatus, for example.

<Fifth Embodiment>

The fifth embodiment of the invention will be described with reference to FIGS. 22 through 26. The fifth embodiment concerns the image signal processing apparatus that detects the magnification scale (m/n) and the reference phase ($\delta$) from an input video signal. The magnification scale (m/n) and the reference phase ($\delta$) need not be transmitted from the transmitter to the receiver nor predetermined as specified consistent values between the transmitting and receiving sides. Nevertheless, the fifth embodiment makes it possible to generate the sampling carriers ($\cos(2\pi fs^*t+\delta)$ and $\sin(2\pi fs^*t+\delta)$) used for the frequency conversion section (104) according to the first through fourth embodiments of the invention.

Figure 22:
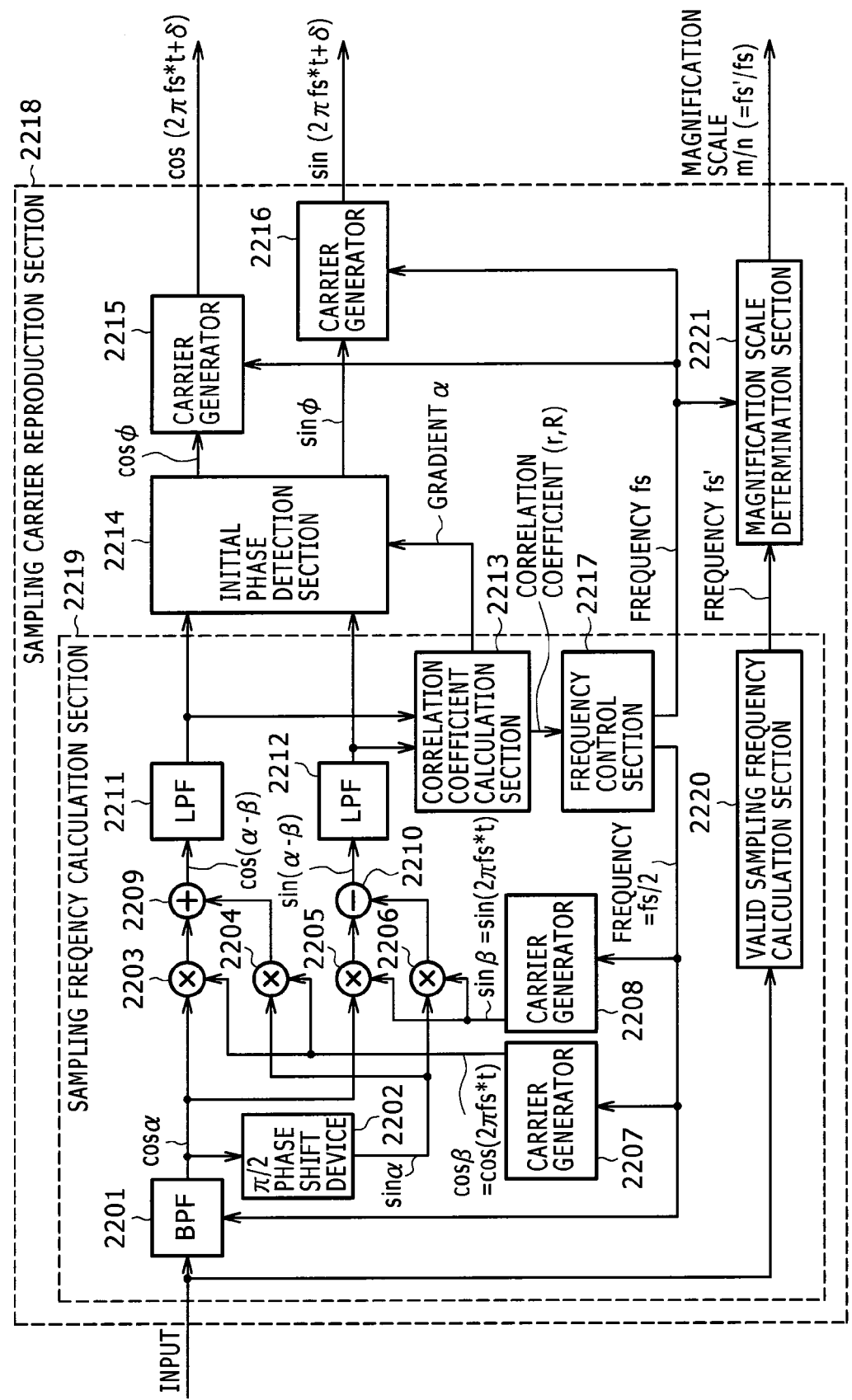
FIG. 22 is an explanatory diagram showing a configuration according to a fifth embodiment of the invention.

FIG. 22 shows a sampling carrier reproduction section (2218) according to the fifth embodiment. In FIG. 22, an image signal is input to a band-pass filter (BPF) (2201). The BPF (2201) allows passing of only frequency components approximate to the same frequency f as carriers (cosine and sine waves) generated by carrier generators (2207) and (2208) to be described later based on information of frequency f from a frequency control section (2217) controlled by correlation coefficients (r and R) to be described later. The BPF (2201) aims at preventing entry of unneeded components or noise and stabilizing processes. Characteristics of the BPF (2201) are irrelevant to the principle of the invention and the detailed description is omitted for simplicity. The sampling carrier reproduction section (2218) then uses a $\pi/2$ phase shift device (2202), multipliers (2203), (2204), (2205), and (2206), carrier generators (2207) and (2208), an adder (2209), and a subtracter (2210) to modulate carriers (cosine and sine waves). The frequency f of the input signal after passing through the BPF is converted into a direct current (frequency 0). This operation is based on the generally known addition theorem of trigonometric functions, i.e., $\cos(\alpha-\beta)=\cos\alpha\cos\beta+\sin\alpha\sin\beta$ and $\sin(\alpha-\beta)=\sin\alpha\cos\beta-\cos\alpha\sin\beta$, where $\alpha$ is assumed to be the input signal frequency and $\beta$ is assumed to be the carrier frequency. Frequencies can be converted while maintaining the phase orthogonality ($\pi/2$ phase shift). The sampling carrier reproduction section (2218) then uses low-pass filters (LPFs) (2211) and (2212) to extract only frequencies approximate to direct currents of the signals. An output from the LPF (2211) indicates the signal intensity in the real (Re) axis direction on a complex plane corresponding to input signal components approximate to the carrier frequency. An output from the LPF (2212) indicates the signal intensity in the imaginary (Im) axis direction on a complex plane corresponding to input signal components approximate to the carrier frequency. The LPFs (2211) and (2212) suppress an influence such as noise. The LPFs (2211) and (2212) are not directly relevant to the principle of the invention and the detailed description is omitted for simplicity. The sampling carrier reproduction section (2218) supplies outputs from the LPFs (2211) and (2212) to a correlation coefficient calculation section (2213) to be described later. The correlation coefficient calculation section (213) generates signals for gradient a and correlation coefficients (r and R). As mentioned above, the frequency control section (2217) controlled by the correlation coefficients (r and R) calculates the frequency f (fs/2) and outputs the frequency f or the sampling frequency fs calculated from the frequency f for the video signal before the pixel size conversion. A valid sampling frequency calculation section (2220) detects the sampling frequency fs' for the input video signal, i.e., the video signal after the pixel size at the magnification scale (m/n). The valid sampling frequency calculation section (2220) just needs to detect the sampling frequency (pixel size) of the input video signal itself. This feature can be embodied by using a commonly available pixel size counter, for example, and the detailed description is omitted for simplicity. The above-mentioned components ranging from the BPF (2201) to the valid sampling frequency calculation section (2220) configure a sampling frequency calculation section (2219). The sampling frequency calculation section (2219) is supplied with the video signal after the pixel size conversion at the magnification scale (m/n) and outputs frequencies f (fs/2), fs, and fs' as information about the sampling frequencies before and after the pixel size conversion.

Outputs from the LPFs (2211) and (2212) in the sampling frequency calculation section (2219) are input to an initial phase detection section (2214) that then generates signals for initial phase differences ($\cos\phi$ and $\sin\phi$). Carrier generators (2215) and (2216) generate sampling carriers ($\cos(2\pi fs^*t+\delta)$ and $\sin(2\pi fs^*t+\delta)$) similarly to the carrier generators (803), (1105), and (1106) shown in FIGS. 8, 11, and 12. To do this, the carrier generators (2215) and (2216) use the frequency fs (2f) from the frequency control section (2217) in the sampling frequency calculation section (2219) and the initial phase differences ($\cos\phi$ and $\sin\phi$) generated by the initial phase detection section (2214). The sampling carriers are used for the frequency conversion section (104) according to the first through fourth embodiments.

The sampling frequencies fs and fs' are input to a magnification scale determination section (2221). The sampling frequency fs corresponds to the video signal before the pixel size conversion and is output from the frequency control section (2217) in the sampling frequency calculation section (2219). The sampling frequency fs' corresponds to the video signal after the pixel size conversion and is output from the valid sampling frequency calculation section (2220). The magnification scale determination section (2221) uses these frequencies to calculate the magnification scale (m/n)=fs'/fs. This calculation process will be described later in detail.

According to the above-mentioned configuration, the sampling carrier reproduction section (2218) according to the fifth embodiment is capable of being supplied with a video signal and outputting the sampling carriers ($\cos(2\pi fs^* t+\delta)$ and $\sin(2\pi fs^* t+\delta)$) and the magnification scale (m/n).

With reference to FIGS. 23 to 26, the following describes the operation principle of the sampling carrier reproduction section (2218) shown in FIG. 22.

Figure 23:
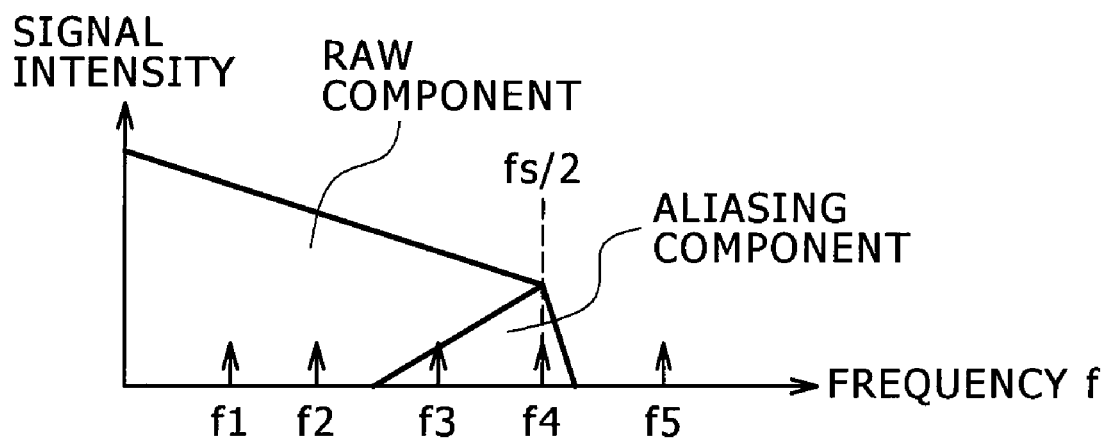
FIG. 23 is an explanatory diagram showing an operation according to a fifth embodiment of the invention.

FIG. 23 exemplarily shows a frequency spectrum for the input image signal. FIG. 23 shows the same frequency spectrum as those shown in FIGS. 6D, 6(d'), and 7A. As mentioned above, a high-pass component in the raw signal exceeds the frequency fs/2, i.e., half the sampling frequency fs before the magnification, and is converted into an aliasing component at fs/2 as a symmetric axis. For example, let us consider to plot signal components of the frequencies f=f1, f2, f3, f4, and f5 pixel by pixel as points on a complex plane. That is, outputs from the LPFs (2211) and (2212) in FIG. 22 are each plotted pixel by pixel on the complex plane including the Re and Im axes.

Figure 24:
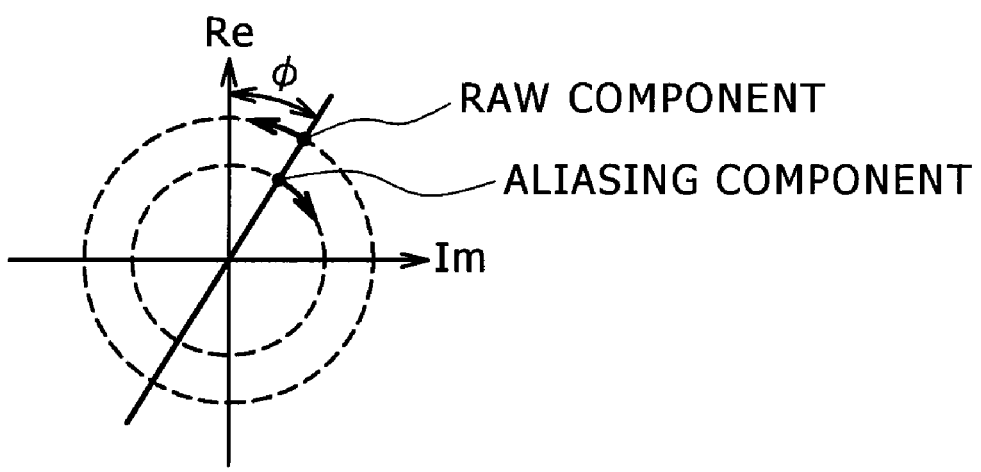
FIG. 24 is another explanatory diagram showing an operation according to the fifth embodiment of the invention.

The known equation is: $\cos(2\pi ft)=(\exp(j2\pi ft)+\exp(-j2\pi ft))/2$. Let us consider that the first term at the right-hand side of this equation is assumed to be a raw component before folding and that the second term at the right-hand side thereof is assumed to be an aliasing component before the frequency conversion using the sampling carrier. As shown in FIG. 24, the raw component and the aliasing component may be assumed to revolve on the complex plane opposite to each other along circular orbits whose radii correspond to the respective signal intensities.

This scheme can be applied to components of the frequencies f=f1, f2, f3, f4, and f5 shown in FIG. 23. Let us plot signal components of the frequencies corresponding to all pixels for one frame on the complex plane. The frequency f=f1 allows only the raw component to be available. There is no correlation between signal intensities or phases at distant pixel positions in one frame. As shown in FIG. 25A, the signal intensity is not correlated with the Re or Im axis. The plotted points disperse circularly. Similarly to f=f1, the frequency f=f2 allows only the raw component to be available. As seen from FIG. 23, the signal intensity at the frequency f2 is smaller than the signal intensity at the frequency f1. The radius of the circle in FIG. 25B is smaller than that in FIG. 25A.

By contrast, as shown in FIG. 23, the frequency f=f3 contains an aliasing component. As shown in FIG. 24, the raw component and the aliasing component revolve opposite to each other. A resultant vector (i.e., pixel value) of both moves on the complex plane to generate a locus that forms an oval distribution as shown in FIG. 25C.

The frequency f=f4(fs/2) coincides with the symmetric axis for folding. The signal intensity of the raw component matches that of the aliasing component. Once the aliasing component occurs, the same signal intensity is maintained between the raw component and the aliasing component even though an intermediate signal process occurs at any time. The frequency f4 ensures the same signal intensity for the raw component and the aliasing component that revolve opposite to each other. A resultant vector of both moves on the complex plane to generate a locus that forms a linear distribution as shown in FIG. 25D.

The frequency f=f5 attenuates signal components. Points plotted on the complex plane concentrate on an origin as shown in FIG. 25E.

Actually, the plotted points do not completely linearly distribute as shown in FIG. 25D due to an effect of noise or incompleteness of the filter for extracting frequency components. The points tend to be plotted on the complex plane approximately as mentioned above. Accordingly, the frequency control section (2217) shown in FIG. 22 gradually varies the frequency. As shown in FIG. 25D, the distribution of points on the complex plane most approximates to be linear. The frequency (f=f4) at this time may be assumed to be equivalent to the frequency (fs/w) that matches the symmetric axis for folding.

Figure 26:
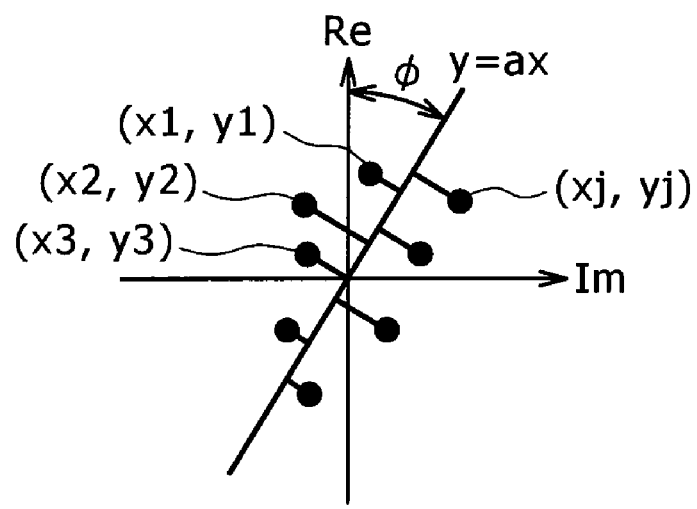
FIG. 26 is still another explanatory diagram showing an operation according to the fifth embodiment of the invention.

With reference to FIG. 26, the following describes operations of the correlation coefficient calculation section (2213) shown in FIG. 22, namely, an example method of confirming distribution of points on the complex plane. FIG. 26 shows a virtual line (y=ax) that passes through the origin on the complex plane and is provided with gradient a. The least square method is used to find a value for the gradient a so as to minimize the sum of squared distances between the line and points (x1,y1), (x2,y2), (x3,y3), . . . , and (xj,yj). The line (y=ax) is referred to as a regression line using the distance between a point and a line.

The regression line will be briefly described with reference to equations in FIG. 31. Sxx of equation (1) in FIG. 31 is assigned the sum of squared values for x in the points (x1,y1), (x2,y2), (x3,y3), . . . , and (xj,yj). Similarly, Syy of equation (2) in FIG. 31 is assigned the sum of squared values for y in the points. Sxy of equation (3) in FIG. 31 is assigned the sum of products of values x and y in the points. Consequently, f(a) of equation (4) in FIG. 31 is assigned the sum of squared distances between the line (y=ax) and the points in FIG. 26 using the line gradient A as a parameter. The purpose is to find "a" that minimizes the value for f(a). Equation (5) in FIG. 31 differentiates between f(a) and a to calculate df(a)/da=0. Then, equation (6) in FIG. 31 can yield a. Assigning the value of a to equation (4) in FIG. 31 can yield the minimum value (fmin) for the sum of squared distances between the line (y=ax) and the points (x1,y1), (x2,y2), (x3,y3), . . . , and (xj,yj) shown in FIG. 26. The minimum value (fmin) can be transformed into equation (7) in FIG. 31 using parameter r for equation (8) in FIG. 31, where $0 \leq r \leq 1$. Code "sqrt" for equation (8) in FIG. 31 represents the root sign.

Given r=0, equation (8) in FIG. 31 yields $4(SxxSyy-Sxy^2)=(SXX+Syy)^2$, i.e., $-4Sxy^2=(Sxx-Syy)^2$, resulting in Sxy=0 and Sxx=Syy. Equation (5) in FIG. 31 shows df(a)/da, i.e., the differential value of f(a) that is always 0 independently of the value of a. The sum of squared distances between the line (y=ax) and the points in FIG. 26 becomes constant independently of the value of a. Equation (7) in FIG. 31 yields fmin=(Sxx+Syy)/2. The points are geometrically uncorrelated with each other.

Given r=1, equation (7) in FIG. 31 yields fmin=0. This signifies very strong correlation because all the points (x1, y1), (x2,y2), (x3,y3), . . . , and (xj,yj) are placed on the line (y=ax).

According to the above-mentioned description, the correlation coefficient calculation section (2213) shown in FIG. 22 outputs a distribution state of the points on the complex plane as parameter r of equation (8) in FIG. 31. At this time, the correlation coefficient calculation section (2213) gradually varies the frequency f for the carriers $\cos(2\pi f^* t)$ and $\sin(2\pi f^* t)$ generated from the carrier generators (2207) and (2208). When the value of r is maximized, the correlation coefficient calculation section (2213) assumes that the points on the complex plane most approximate to the linear distribution. Further, the correlation coefficient calculation section (2213) assumes that the frequency f at that time is half the original sampling frequency fs, i.e., f=fs/2. Instead of parameter r in equation (8) in FIG. 31, parameter R ($0 \leq R \leq 0.25$) in equation (9) in FIG. 31 may be used to decrease the number of square root operations. The points are assumed to be placed linearly when R=0, i.e., r=1. The points are assumed to be geometrically uncorrelated with each other when R=0.25, i.e., r=0. When the value of R is minimized, the frequency f may be assumed to be half the original sampling frequency fs, i.e., fs/2. The parameter r or R is generally termed a correlation coefficient.

With reference to equations in FIG. 32, the following describes operations of the initial phase detection section (2214) and the carrier generators (2215) and (2216) shown in FIG. 22. Angle φ is formed between the line (y=ax) and the Re axis shown in FIG. 26. The angle φ can be represented by equations (10) and (11) in FIG. 32 using the gradient a used for the equations in FIG. 31. The carrier generators (803), (1105), and (1106) in FIGS. 8, 11, and 12 generate carriers whose frequency is fs. The carrier generators (2207) and (2208) in FIG. 22 generate carriers whose frequency is fs/2. The frequency fs is double the frequency fs/2. There is relation δ=2φ between the angle φ and the reference phase (δ) shown in FIGS. 8, 11, and 12. Based on this relation, the initial phase detection section (2214) calculates equations (12) and (13) in FIG. 32 to generate cos δ and sin δ. Using these pieces of information, the carrier generators (2215) and (2216) calculate equations (14) and (15) in FIG. 32 to generate sampling carriers cos(2πfs*t+δ) and sin(2πfs*t+δ).

It may be preferable to provide a state holding section in each of the carrier generators (2215) and (2216) so that the carrier generators (2215) and (2216) shown in FIG. 22 can ensure constant outputs, i.e., sampling carriers cos(2πfs*t+δ) and sin(2πfs*t+δ), per frame. The previous state (carrier frequency and phase) can be stored for autonomous operation even when no signal is available from the carrier generators (2207) and (2208) or the initial phase detection section (2214). It is preferable to configure the sampling carriers cos(2πfs*t+δ) and sin(2πfs*t+δ) so as to continuously take effect. The autonomous period may be used to gradually vary the frequency f for the carriers cos(2πf*t) and sin(2πf*t) generated from the carrier generators (2207) and (2208) as mentioned above. When the value of r is maximized, it may be assumed that the points on the complex plane most approximate to the linear distribution. The frequency f at that time may be assumed to be half the original sampling frequency fs, i.e., f=fs/2. For example, all pixels for one frame may be used during the autonomous period to determine the frequency f and initial phase (cost and sing) while the frequency f is gradually changed during a one-frame period. The determined frequency f and initial phase (cost and sing) may be used for the next one frame to generate the sampling carriers cos(2πfs*t+δ) and sin(2πfs*t+δ).

While there has been described an example of the method for confirming the distribution of points on the complex plane with reference to the equations in FIGS. 26 and 31, the present invention is not limited thereto. For example, the correlation coefficient calculation section (2213) shown in FIG. 22 may use a widely known principal component analysis technology. The distribution is assumed to be approximately linear when a ratio between proper values or contribution percentages of first and second principal components is large. The distribution is assumed to be uncorrelated when the ratio is small or the proper values or contribution percentages are equal. Obviously, the same operation can be embodied in this manner. In the above description, all pixels contained in a frame are plotted on the complex plane shown in FIG. 26. The invention is not limited thereto. One frame may be divided into small regions. The distribution of points may be measured in each region. The majority of determination results may be assumed to be the determination result concerning the entire frame. The determination process may be performed on properly selected pixels, not all pixels contained in one frame to reduce the overall throughput.

Arithmetic expressions represented by the equations in FIGS. 31 and 32 can be embodied by appropriately combining general computing units such as an adder, a subtracter, a multiplier, and a divider with a lookup table of input values and output values (arithmetic results) associated with each other. Further, a signal processing processor can execute the arithmetic expressions coded in software. Devices for performing the equations in FIGS. 31 and 32 are omitted from the drawings.

When an up-converted magnification scale is constant throughout one frame, the outputs (sampling carriers cos(2πfs*t+δ) and sin(2πfs*t+δ)) from the carrier generators (2215) and (2216) also become constant within one frame. On the other hand, a superimpose process may be applied to embed an image of different magnification scales in some regions of one frame. In such case, the embedded regions may be distinguished and processed separately. It may be preferable to output sampling carriers cos(2πfs*t+δ) and sin(2πfs*t+δ) for the embedded regions.

The magnification scale determination section (2221) can find an up-converted magnification scale using frequencies fs (2f) and fs'. The frequency control section (2218) outputs the frequency fs. The valid sampling frequency calculation section (2220) calculates the sampling frequency fs' for a video signal whose pixel size is converted. An input low-resolution video may be provided with the pixel size multiplied by m/n, where m and n are integers. In this case, relational expression fs=fs'*n/m holds between the frequency fs and the sampling frequency fs' after the pixel size conversion. It is possible to detect the magnification scale (m/n) by solving the magnification scale m/n=fs'/fs=2 fs'/f.

As mentioned above, the sampling carrier reproduction section (2218) in FIG. 22 outputs the sampling carriers cos(2πfs*t+δ) and sin(2πfs*t+δ) for one-dimensional frequencies. The invention is not limited thereto. The BPF (2201), the π/2 phase shift device (2202), the carrier generators (2207), (2208), (2215), and (2216), the LPFs (2211) and (2212), and the frequency control section (2218) may be provided with frequency characteristics using one of or a combination of any of a horizontal frequency, a vertical frequency, and a time frequency. Variable t may be replaced with x (horizontal pixel position), y (vertical pixel position), or t (time). This makes it possible to reproduce one-, two-, or three-dimensional sampling carriers. In this case, (2πfs*t+δ) may be replaced with (2π(μs*x+vs*y+fs*t)), where μs denotes the horizontal sampling frequency, vs denotes the vertical sampling frequency, and fs denotes the time sampling frequency.

The sampling carrier reproduction section (2218) in FIG. 22 can be applied to vertical frequencies. In this case, the result (cos φ and sin φ) of the initial phase detection section (2214) can be used to determine whether the signal before the up-conversion complies with progressive scanning or interlace scanning. This operation is described below.

Figure 27:
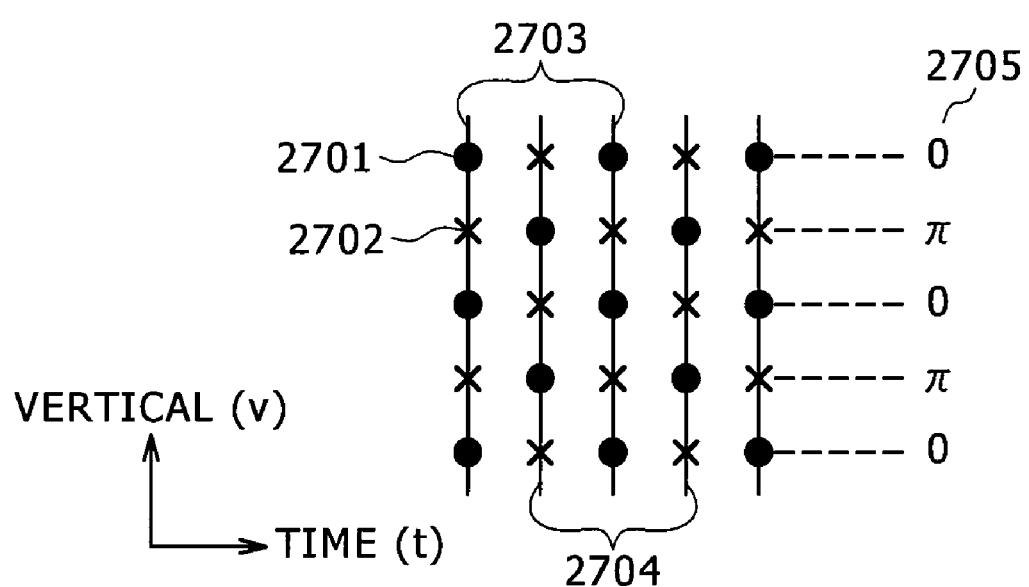
FIG. 27 is yet another explanatory diagram showing an operation according to the fifth embodiment of the invention.

FIG. 27 shows arrangement of scanning lines for an interlace-scanned image signal in a two-dimensional space of time axis (t) and vertical axis (v). A scanning line (2701) is transmitted. A scanning line (2702) is skipped and is not transmitted. As seen from FIG. 27, positions of the scanning lines (2701) and (2702) alternate in an even-numbered field (2703) and an odd-numbered field (2704). The even-numbered field (2703) assigns "0" to a sampling phase (2705) for the transmitted scanning line (2701) and "π" to the sampling phase (2705) for the non-transmitted scanning line (2702). The odd-numbered field (2704) assigns "π" to the sampling phase (2705) for the transmitted scanning line (2701) and "0" to the sampling phase (2705) for the non-transmitted scanning line (2702). The vertical sampling phase (205) always indicates a difference "π" between the even-numbered field (2703) and the odd-numbered field (2704).

FIGS. 3A through 3C show two signals with different sampling phases. Of these signals, the phases of the raw components (301) and (302) always match as shown in FIG. 3B. The phases of the aliasing components (305) and (306) vary with the sampling phase difference θ (202) as shown in FIG. 3C.

The interlace-scanned image signal allows the phase of the raw signal to be constant (0) and allows the phase of the aliasing component to vary with the fields like 0, π, 0, π, and so on. This signifies that phase δ in the sampling carriers cos(2πfs*t+δ) and sin(2πfs*t+δ) varies with the fields like δ, (δ+π), δ, (δ+π), and so on while the sampling carriers are output from the sampling carrier reproduction section (2218) shown in FIG. 22. When the interlace scanning causes a field-based change in the sampling carrier phase δ, the change is maintained as is even in an up-converted image signal. The phase δ varies like δ, (δ+π), δ, (δ+π), and so on in even an image signal that is converted from 480i (interlace) to 1080p (progressive), for example.

An originally progressive-scanned image signal always maintains constant positions of the transmitted scanning line independently of the fields. A constant value is always given to the phase 6 in the sampling carriers cos(2πfs*t+δ) and sin(2πfs*t+δ) output from the sampling carrier reproduction section (2218) shown in FIG. 22.

Accordingly, a field-based or frame-based change in the phase δ can be used to determine whether the signal before the up-conversion complies with progressive scanning or interlace scanning. The interlace scanning causes the phase δ in the sampling carriers cos(2πfs*t+δ) and sin(2πfs*t+δ) to vary as δ, (δ+π), δ, (δ+π), and so on field by field. This characteristic can be used to observe whether or not the polarity (positive or negative) is inverted between the sampling carrier for the current frame and that for the next-to-last frame. When the polarity is inverted, the progressive scanning is assumed. Otherwise, the interlace scanning is assumed.

Similarly, the progressive or interlace scanning can be also determined using outputs from the correlation coefficient calculation section (2213) and the initial phase detection section (2214) that process carrier frequency components at fs/2 (=f). Operations will be described in detail below.

Figure 28A:
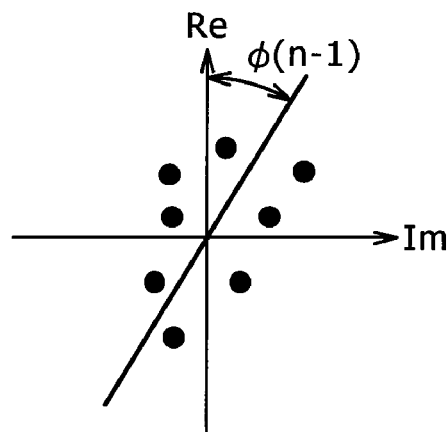
FIGS. 28A and 28B are yet the other explanatory diagrams showing operations according to the fifth embodiment of the invention.
Figure 28B:
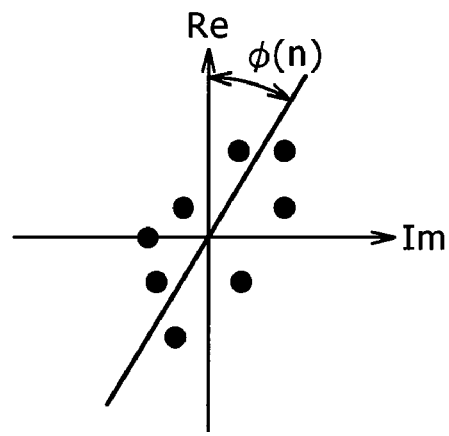

FIGS. 28A and 28B illustrate operations of the correlation coefficient calculation section (2213) when an input image signal is originally progressive-scanned. The vertical sampling phase is unchanged between the (n−1)th frame in FIG. 28A and the nth frame in FIG. 28B. The above-mentioned gradient a of the regression line does not greatly change between frames even though point positions on the complex plane change. The angle φ between the Re axis and the line is almost constant (φ(n)≈φ(n−1)).

Figure 29A:
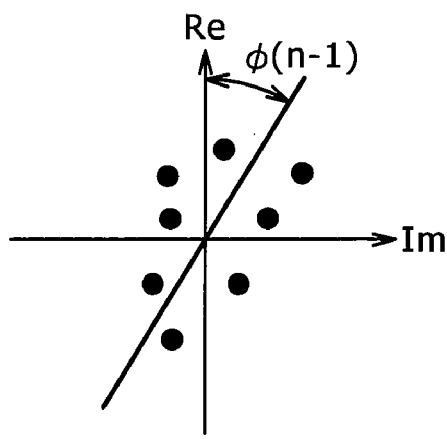
FIGS. 29A and 29B are still yet the other explanatory diagrams showing operations according to the fifth embodiment of the invention.
Figure 29B:
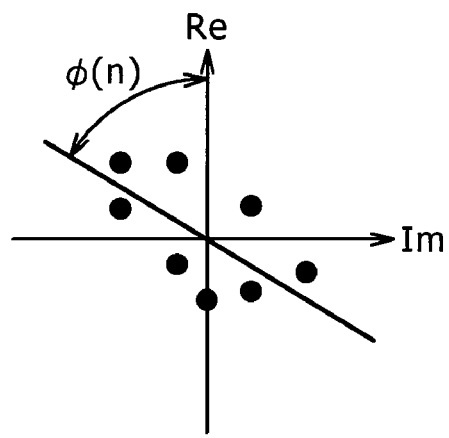

FIGS. 29A and 29B show that an originally interlace-scanned image signal is up-converted into a progressive-scanned signal. The gradient a of the regression line greatly changes between the (n−1)th frame in FIG. 29A and the nth frame in FIG. 29B. As mentioned above, the phase δ in the sampling carriers cos(2πfs*t+δ) and sin(2πfs*t+δ) varies as δ, (δ+π), δ, (δ+π), and so on field by field. The angle φ is half of δ and varies approximately ±π/2 (φ(n)≈φ(n−1)±π/2) frame by frame. Accordingly, a variation between φ(n−1) and φ(n) can be used to determine whether the signal before the up-conversion complies with progressive scanning or interlace scanning.

FIG. 30 shows an example configuration of a progressive/interlace determination section (3001). Frame delay devices (3002) and (3003) in FIG. 30 delay the initial phase (cos φ and sin φ) found by the initial phase detection section (2214) shown in FIG. 22. Multipliers (3004) and (3005) multiply the delayed signals by the signals before the delay. An adder (3006) adds the multiplied signals. The result signifies an inner product (=cos φ(n)*cos φ(n−1)+sin φ(n)*sin φ(n−1)) between the initial phase (cos φ(n) and sin φ(n)) for the current frame and the initial phase (cos φ(n−1) and sin φ(n−1)) for the next-to-last frame. The positive or negative polarity of the inner product is meaningless. An absolute value computing unit (3007) calculates an absolute value of the inner product. To suppress an influence such as noise, an average computing unit (3008) finds an average of the inner products for multiple pixels (e.g., all the pixels per frame). A comparator (3010) compares the average with a threshold value (3009) and generates a progressive/interlace determination result. As already mentioned with reference to FIGS. 28A through 29B, the initial phase φ is almost constant for every frame of a signal that is progressive-scanned before up-conversion. The average of inner products approximates to 1. The initial phase φ is orthogonal for every frame of a signal that is interlace-scanned before up-conversion. The average of inner products approximates to 0. For example, the threshold value (3009) may be set to approximately 0.7 (=cos(π/4)). The signal may be determined to be progressive-scanned when the average of absolute values of the inner products is greater than the threshold value. The signal may be determined to be interlace-scanned when the average of absolute values of the inner products is smaller than the threshold value.

As mentioned above, the image signal processing apparatus according to the fifth embodiment is capable of finding the sampling frequency (i.e., pixel size), the sampling phase, and the up-conversion magnification scale for the signal before the up-conversion from the up-converted video signal. The image signal processing apparatus is also capable of determining the scanning mode such as progressive or interlace for the video signal before the up-conversion. A determination result may be used to change the contents of an image signal process depending on the scanning mode such as progressive or interlace for the video signal before the up-conversion. For example, the resolution may be improved only when the video signal before the up-conversion is interlace-scanned or progressive-scanned.

<Sixth Embodiment>

The image signal processing apparatus according to the sixth embodiment of the invention is configured by partially replacing the configuration of the image signal processing apparatus in FIG. 1 according to the first or third embodiment with the sampling carrier reproduction section (2218) shown in FIG. 22. Specifically, the sampling carrier reproduction section (2218) is substituted for the carrier generator (803) shown in FIG. 8 or the carrier generators (1105) and (1106) shown in FIG. 11 included in the frequency conversion section (104).

The first or third embodiment generates a sampling carrier using the reference phase (δ) that is input to the image signal processing apparatus or is stored in the storage section (108) shown in FIG. 1. In the image signal processing apparatus according to the sixth embodiment, a video signal is input to the sampling carrier reproduction section (2218) shown in FIG. 22. The sampling carrier reproduction section (2218) generates a sampling carrier that can be used for the frequency conversion section (104). The frequency conversion section (104) can also use the magnification scale (m/n) generated by the sampling carrier reproduction section (2218).

The other configurations of the image signal processing apparatus according to the sixth embodiment are the same as those of the image signal processing apparatus according to the first or third embodiment and the description about the other configurations is omitted for simplicity.

The image signal processing apparatus according to the sixth embodiment eliminates the need for input of a reference phase ($\delta$) or a magnification scale (m/n) from the outside and is capable of providing an effect of appropriately improving the resolution of an image signal whose pixel size is converted in advance.

The image signal processing apparatus according to the sixth embodiment also eliminates the need for previously storing a specified reference phase ($\delta$) or a specified magnification scale (m/n) in a storage section and is capable of providing an effect of appropriately improving the resolution of an image signal whose pixel size is converted in advance.

For example, a transmitter at a broadcasting station may previously up-convert multiple types of videos using various reference phases ($\delta$) and magnification scales (m/n) When receiving such videos as inputs, the image signal processing apparatus can improve the resolution appropriate to the respective videos without input or configuration of the reference phase ($\delta$) or the magnification scale (m/n).

<Seventh Embodiment>

The image signal processing apparatus according to the seventh embodiment of the invention is configured by partially replacing the configuration of the image signal processing apparatus in FIG. 12 according to the second embodiment with the sampling carrier reproduction section (2218) shown in FIG. 22. Specifically, the sampling carrier reproduction section (2218) is substituted for the carrier generators (1105) and (1106) included in the frequency conversion section (104). Similarly to the sixth embodiment, a video signal is input to the sampling carrier reproduction section (2218) shown in FIG. 22. The sampling carrier reproduction section (2218) generates a sampling carrier that is used for the frequency conversion section (104). The frequency conversion section (104) also uses the magnification scale (m/n) generated by the sampling carrier reproduction section (2218).

The other configurations of the image signal processing apparatus according to the seventh embodiment are the same as those of the image signal processing apparatus according to the second and fifth embodiments and the description about the other configurations is omitted for simplicity.

The image signal processing apparatus according to the seventh embodiment is capable of providing the same effect as the second embodiment without needing for supplying a reference phase ($\delta$) or a magnification scale (m/n) from the outside or previously storing a specified reference phase ($\delta$) or a specified magnification scale (m/n) in a storage section.

For example, a transmitter at a broadcasting station may previously up-convert multiple types of videos using various reference phases ($\delta$) and magnification scales (m/n). When receiving such videos as inputs, the image signal processing apparatus can improve the resolution appropriate to the respective videos without input or configuration of the reference phase ($\delta$) or the magnification scale (m/n).

<Eighth Embodiment>

The image signal processing apparatus according to the eight embodiment of the invention is configured by partially replacing the configuration of the image signal processing apparatus in FIG. 21 according to the fourth embodiment with the sampling carrier reproduction section (2218) shown in FIG. 22. Specifically, the sampling carrier reproduction section (2218) is substituted for the carrier generators (1105) and (1106) included in the frequency conversion section (104) of the high-pass component reproduction section (106). Similarly to the seventh embodiment, a video signal is input to the sampling carrier reproduction section (2218) shown in FIG. 22. The sampling carrier reproduction section (2218) generates a sampling carrier that is used for the frequency conversion section (104). The frequency conversion section (104) also uses the magnification scale (m/n) generated by the sampling carrier reproduction section (2218).

The other configurations of the image signal processing apparatus according to the eighth embodiment are the same as those of the image signal processing apparatus according to the fourth and fifth embodiments and the description about the other configurations is omitted for simplicity.

The image signal processing apparatus according to the eight embodiment is capable of providing the same effect as the fourth embodiment without needing for supplying a reference phase ($\delta$) or a magnification scale (m/n) from the outside or previously storing a specified reference phase ($\delta$) or a specified magnification scale (m/n) in a storage section.

For example, a transmitter at a broadcasting station may previously up-convert multiple types of videos using various reference phases ($\delta$) and magnification scales (m/n). When receiving such videos as inputs, the image signal processing apparatus can improve the resolution appropriate to the respective videos without input or configuration of the reference phase ($\delta$) or the magnification scale (m/n).

The embodiments of the invention are applicable to not only the devices described in the embodiments but also DVD players, magnetic disk players, and semiconductor memory players, for example. In addition, the embodiments are applicable to portable image display terminals such as mobile telephones for receiving one-segment broadcasting, for example.

The image frame may be applicable to signals other than television broadcasting signals. Available image frames may include those for streaming images transmitted via the Internet or images reproduced from a DVD or HDD player, for example.

The above-mentioned embodiments provide examples of improving the resolution in units of frames. The resolution improvement is not limited to the entire frame. For example, the resolution improvement may be applied to part of a frame of input image or video. An image process as the embodiment of the invention may be applied to part of the frame of input image or video. It is possible to generate a high-resolution enlarged image from part of the frame of input image or video. For example, the resolution improvement is applicable to partial enlargement of video for display.

The embodiments of the invention can appropriately convert a low-resolution image into a high-resolution image and appropriately provide a high-quality high-resolution image.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An image signal processing apparatus comprising:
   an input section supplied with an image signal whose pixel size is converted at a predetermined magnification scale;
   a sampling frequency calculation section that uses the input image signal after pixel size conversion and calculates sampling frequencies for the image signal before and after pixel size conversion; and a magnification scale determination section that determines a magnification scale using a ratio of sampling frequencies calculated by the sampling frequency calculation section for the image signal before and after pixel size conversion, wherein:

the sampling frequency calculation section calculates a sampling frequency for an image signal before pixel size conversion, the sampling frequency causing a signal intensity of an aliasing component contained in the input image signal to be equal to a signal intensity of a component before being the aliasing component, the sampling frequency calculation section extracts a first phase component signal from the input image signal;

the sampling frequency calculation section generates a second phase component signal whose phase is orthogonal to the first phase component signal;

the sampling frequency calculation section acts on the first and second phase component signals to calculate a coefficient indicative of correlation between the first and second phase component signals at a plurality of different frequencies; and the sampling frequency calculation section acts on the coefficient to calculate a sampling frequency for an image signal before pixel size conversion, the sampling frequency being double a frequency that causes a signal intensity of an aliasing component contained in the input image signal to be equal to a signal intensity of a component before being the aliasing component.

2. The image signal processing apparatus according to claim 1, further comprising:

a sampling phase detection section that uses the input image signal to measure a sampling phase for an image signal before pixel size conversion; and a sampling carrier reproduction section that generates a sampling carrier for an image signal before pixel size conversion using a sampling frequency calculated by the sampling frequency calculation section for an image signal before pixel size conversion and a sampling frequency detected by the sampling phase detection section for an image signal before pixel size conversion.

3. An image signal processing method comprising the steps of:

(a) inputting an image signal whose pixel size is converted at a predetermined magnification scale;

(b) using the input image signal and calculating sampling frequencies for the image signal before and after pixel size conversion; and (c) determining a magnification scale using a ratio of sampling frequencies calculated by the step (b) for the image signal before and after pixel size conversion, wherein the step (b):

calculates a sampling frequency for an image signal before pixel size conversion, the sampling frequency being double a frequency that causes a signal intensity of an aliasing component contained in the input image signal to be equal to a signal intensity of a component before being the aliasing component, extracts a first phase component signal from the input image signal, generates a second phase component signal whose phase is orthogonal to the first phase component signal, acts on the first and second phase component signals to calculate a coefficient indicative of correlation between the first and second phase component signals at a plurality of different frequencies, and acts on the coefficient to calculate a sampling frequency for an image signal before pixel size conversion, the sampling frequency causing a signal intensity of an aliasing component contained in the input image signal to be equal to a signal intensity of a component before being the aliasing component.

4. The image signal processing method according to claim 3, further comprising the steps of:

(d) using the input image signal to measure a sampling phase for an image signal before pixel size conversion; and (e) generating a sampling carrier for an image signal before pixel size conversion using a sampling frequency calculated at the step (b) for an image signal before pixel size conversion and a sampling frequency detected at the step (d) for an image signal before pixel size conversion.

5. A video display apparatus comprising:

an input section supplied with a video signal including an image signal whose pixel size is converted at a predetermined magnification scale;

a sampling frequency calculation section that uses the input image signal after pixel size conversion and calculates sampling frequencies for the image signal before and after pixel size conversion;

a magnification scale determination section that determines the predetermined magnification scale using a ratio of sampling frequencies calculated by the sampling frequency calculation section for an image signal before and after pixel size conversion;

a sampling carrier reproduction section that uses the input image signal after pixel size conversion to calculate a sampling phase for an image signal before pixel size conversion and uses a sampling frequency and a sampling phase for the image signal before pixel size conversion to generate a sampling carrier for an image signal before pixel size conversion;

a raw component signal generation section that uses the predetermined magnification scale determined by the magnification scale determination section to generate a raw component with an aliasing component removed or reduced from the input video signal;

a high-resolution image signal generation section that generates a high-pass component signal based on an aliasing component contained in the video signal and a sampling carrier generated by the sampling carrier reproduction section before pixel size conversion and generates a high-resolution image signal using the raw component signal generated by the raw component signal generation section and the high-pass component signal; and a display section that displays a high-resolution video signal generated by the resolution conversion section, wherein:

the sampling frequency calculation section calculates a sampling frequency for an image signal before pixel size conversion, the sampling frequency causing a signal intensity of an aliasing component contained in the input image signal to be equal to a signal intensity of a component before being the aliasing component, the sampling frequency calculation section extracts a first phase component signal from the input image signal;

the sampling frequency calculation section generates a second phase component signal whose phase is orthogonal to the first phase component signal;

the sampling frequency calculation section acts on the first and second phase component signals to calculate a coefficient indicative of correlation between the first and second phase component signals at a plurality of different frequencies; and the sampling frequency calculation section acts on the coefficient to calculate a sampling frequency for an image signal before pixel size conversion, the sampling frequency being double a frequency that causes a signal intensity of an aliasing component contained in the input image signal to be equal to a signal intensity of a component before being the aliasing component.

6. The video display apparatus according to claim 5, wherein the raw component signal generation section performs a phase shift process on an image signal contained in the video signal and multiplies a coefficient by image signals before and after the phase shift process, the image signals being added to each other, to generate a raw component signal; and wherein the coefficient is calculated by using the predetermined magnification scale determined by the magnification scale determination section and a phase difference between image signals in the video signal.

7. The video display apparatus according to claim 5, wherein the high-resolution image signal generation section includes:

an aliasing component signal generation section that extracts an aliasing component from the video signal and generates an aliasing component signal;

a frequency conversion section that converts a frequency of an aliasing component generated by the aliasing component signal generation section using the sampling carrier generated by the sampling carrier reproduction section before pixel size conversion and generates a high-pass component signal; and an adding/mixing section that adds or mixes a high-pass component generated by the frequency conversion section with a raw component signal generated by the raw component signal generation section.

* * * * *